United States Patent [19]

Price et al.

[11] Patent Number: 5,503,465
[45] Date of Patent: Apr. 2, 1996

[54] WHEEL COVER ATTACHMENT SYSTEM

[75] Inventors: John A. Price, Syracuse, Ind.; Long C. Hsu, Tainan, Taiwan

[73] Assignee: Dicor Corporation, Elkhart, Ind.

[21] Appl. No.: 209,794

[22] Filed: Mar. 10, 1994

Related U.S. Application Data

[60] Division of Ser. No. 417,379, Oct. 5, 1989, Pat. No. 5,294,189, which is a continuation-in-part of Ser. No. 406,680, Sep. 13, 1989, abandoned.

[51] Int. Cl.$^6$ ........................................................ B60B 7/14
[52] U.S. Cl. .................................... 301/37.37; 301/35.62; 301/108.4
[58] Field of Search ............................... 301/37.1, 37.37, 301/37.29, 35.62, 108.1, 108.4

[56] References Cited

U.S. PATENT DOCUMENTS

| | | |
|---|---|---|
| 1,810,195 | 6/1931 | Wharam . |
| 1,896,066 | 2/1933 | Brown . |
| 1,979,895 | 11/1934 | Maker . |
| 2,166,216 | 7/1939 | Lyon . |
| 2,217,086 | 10/1940 | Whitacre . |
| 2,328,301 | 8/1943 | Shaw, Jr. . |
| 2,493,366 | 1/1950 | Simcich . |
| 2,594,407 | 4/1952 | Earnest . |
| 2,722,822 | 11/1955 | Thomas . |
| 3,170,733 | 2/1965 | Lamme . |
| 3,202,460 | 8/1965 | Holbrow . |
| 3,287,067 | 11/1966 | Brown . |
| 3,367,722 | 2/1968 | Miyanaga . |
| 3,513,673 | 5/1970 | Trainor . |
| 3,534,570 | 10/1970 | Mauro . |
| 3,619,010 | 11/1971 | Foster . |
| 3,833,266 | 9/1974 | Lamme . |
| 3,860,297 | 1/1975 | Solis . |
| 3,918,764 | 11/1975 | Lamme . |
| 4,123,111 | 10/1978 | Renz et al. . |
| 4,161,869 | 7/1979 | Dixon . |

(List continued on next page.)

FOREIGN PATENT DOCUMENTS

| | | |
|---|---|---|
| 446234 | 1/1948 | Canada . |
| 0305231 | 3/1989 | European Pat. Off. . |
| 653816 | 3/1929 | France . |
| 268524 | 12/1933 | Italy . |
| 290098 | 5/1928 | United Kingdom . |
| 721679 | 1/1955 | United Kingdom . |
| 1028861 | 5/1966 | United Kingdom . |

OTHER PUBLICATIONS

"SPIKES SPIDER; Winter Safety from the Alps," promotional literature, 1987.
Photographs of collet for possible use with "SPIKES SPIDER" product.
"JIFFY Custom Wheel Covers," promotional literature, circa 1986–1987.
"Stainless Steel Wheel Cover Installation Instructions," Dicor Corp., Parts SH–RG–95, SH–RJ–95.
"Deluxe WHEEL LINERS," Intertek International Corp., promotional material.
"Air–Gard Tire Inflation System," installation instructions/promotional literature, Dicor Corp.

Primary Examiner—Russell D. Stormer
Attorney, Agent, or Firm—Willian Brinks Hofer Gilson & Lione

[57] ABSTRACT

A method and system for mounting decorative wheel covers uses an adaptor or the like for frictionally engaging the outer periphery of one or more standard lug nuts, without affecting the seat of the lug nut to the wheel. The adaptor further includes a threaded member cooperating with apertures in the wheel cover or similar structure for attaching a decorative wheel cover. Specialized bushings may be used with the adaptors to provide a universal mounting system adaptable for use with a plurality of differently-sized lug nuts. Unitary or multiple-piece wheel covers may be used in conjunction with the mounting adaptors provided. Various ways of inhibiting or preventing relative rotation between wheel cover elements and a wheel are provided in the different embodiments.

28 Claims, 16 Drawing Sheets

U.S. PATENT DOCUMENTS

| | | |
|---|---|---|
| 4,167,294 | 9/1979 | Okazaki et al. . |
| 4,171,851 | 10/1979 | Scruggs . |
| 4,217,002 | 8/1980 | Simpson . |
| 4,240,670 | 12/1980 | Zorn et al. . |
| 4,247,152 | 1/1981 | Brown . |
| 4,261,621 | 4/1981 | Fox . |
| 4,306,751 | 12/1981 | Wegner . |
| 4,346,940 | 8/1982 | Tatar . |
| 4,382,635 | 5/1983 | Brown et al. . |
| 4,396,232 | 8/1983 | Fox . |
| 4,470,638 | 9/1984 | Bartylla . |
| 4,473,258 | 9/1984 | Fox . |
| 4,576,415 | 3/1986 | Hempelmann . |
| 4,606,582 | 8/1986 | Warren . |
| 4,632,465 | 12/1986 | Cummings . |
| 4,723,818 | 2/1988 | Beisch et al. . |
| 4,787,681 | 11/1988 | Wang et al. . |
| 4,880,344 | 11/1989 | Henry et al. . |
| 4,881,783 | 11/1989 | Campbell . |
| 4,950,036 | 8/1990 | Patti . |
| 5,294,189 | 3/1994 | Price et al. . |

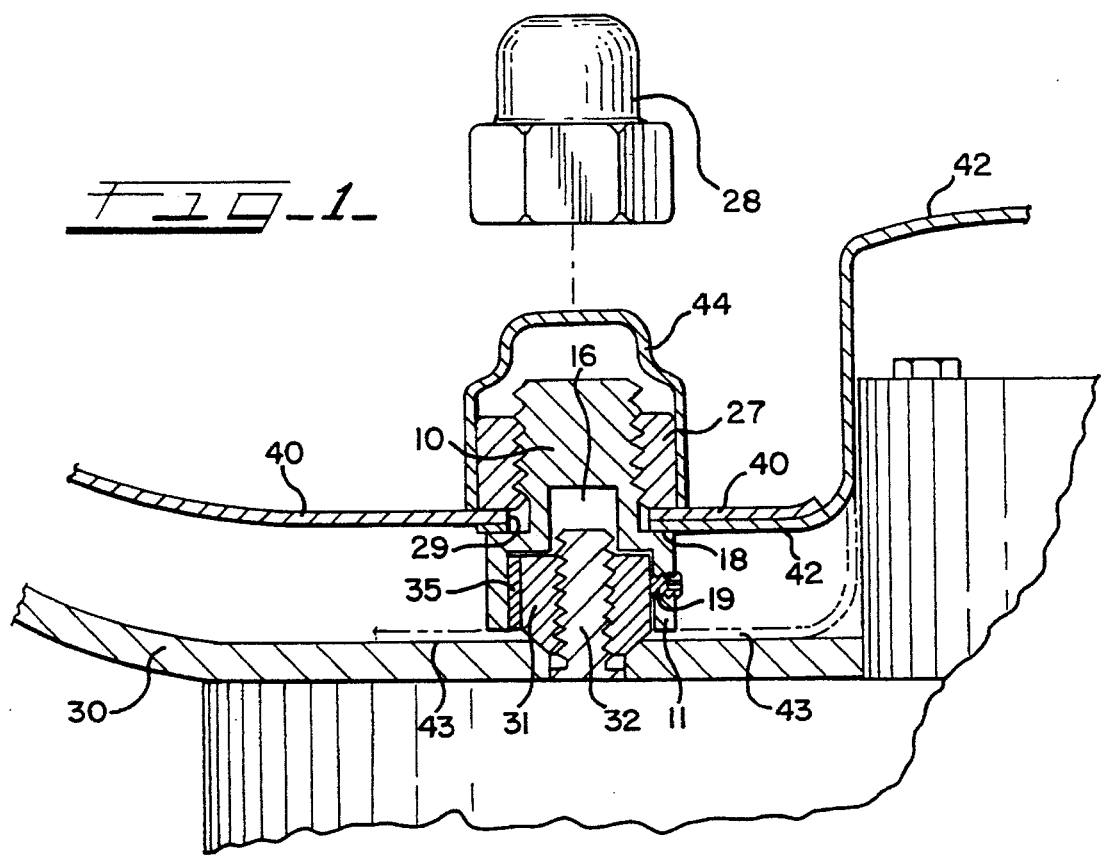
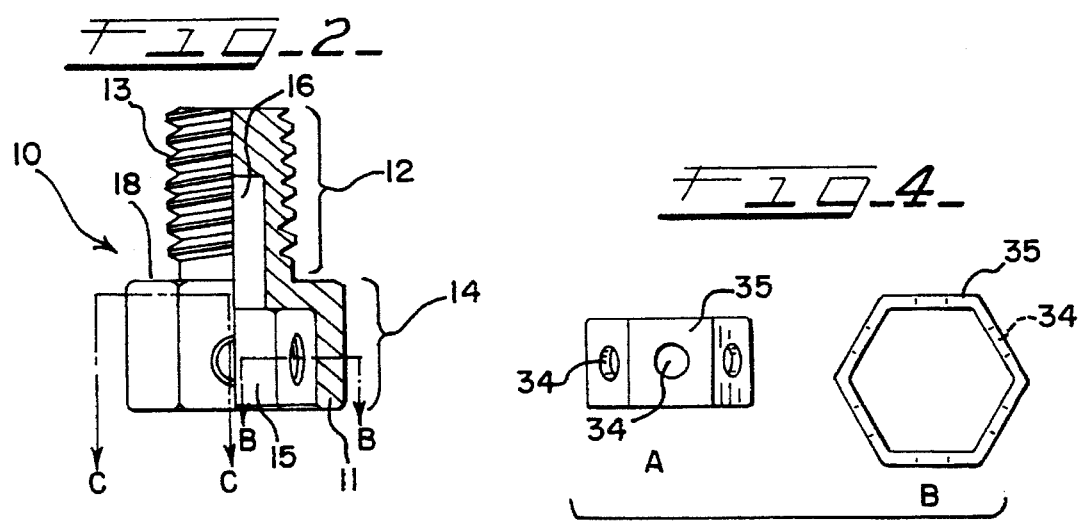
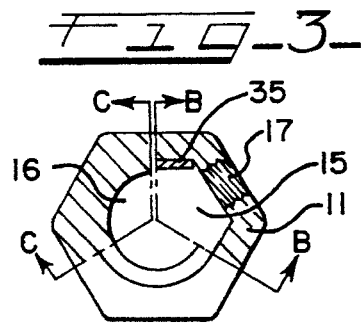

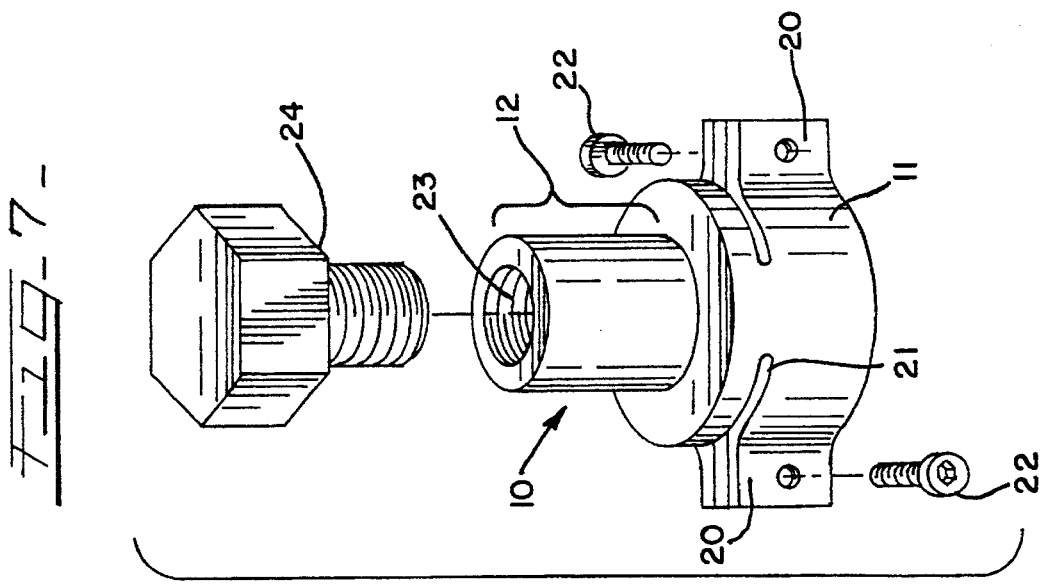
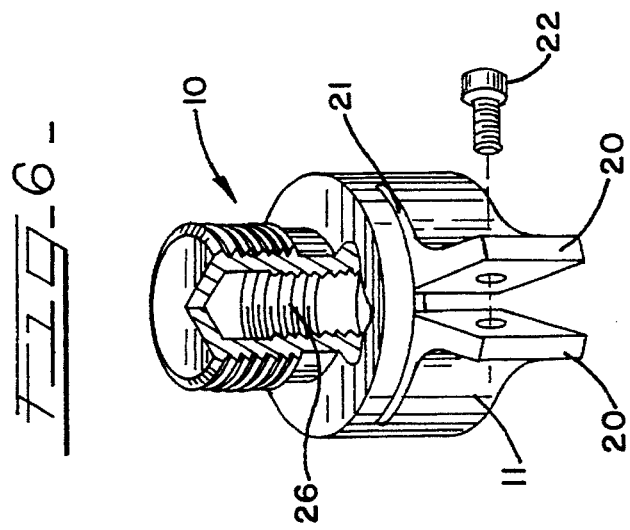
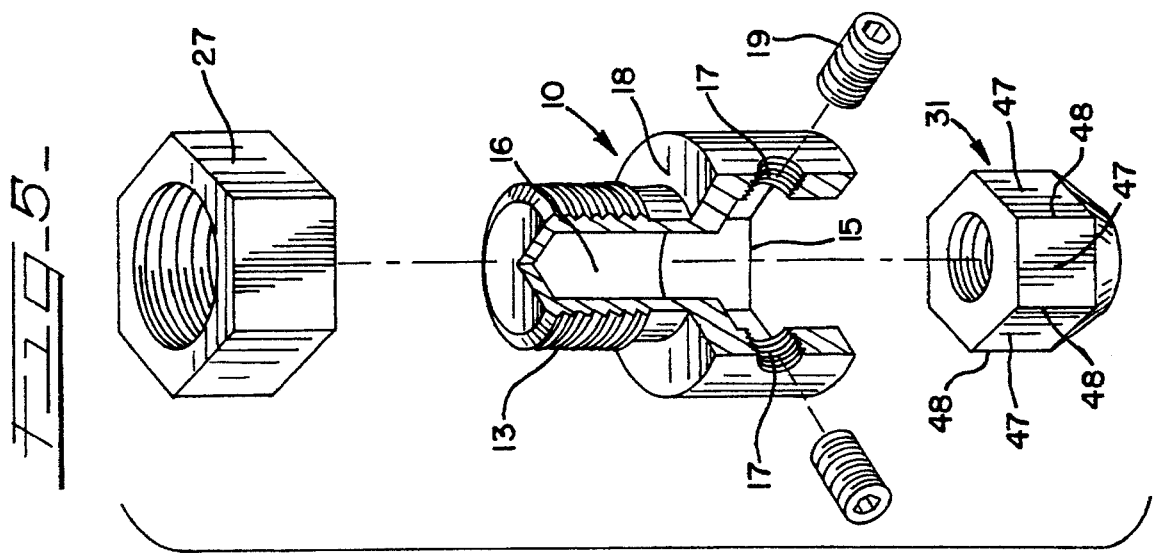

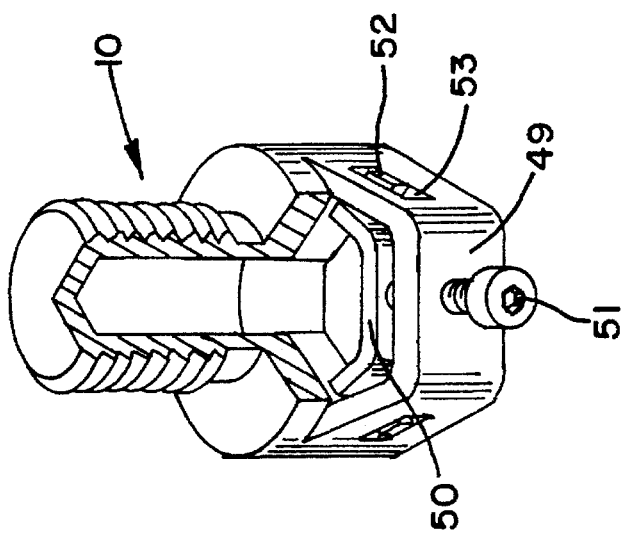
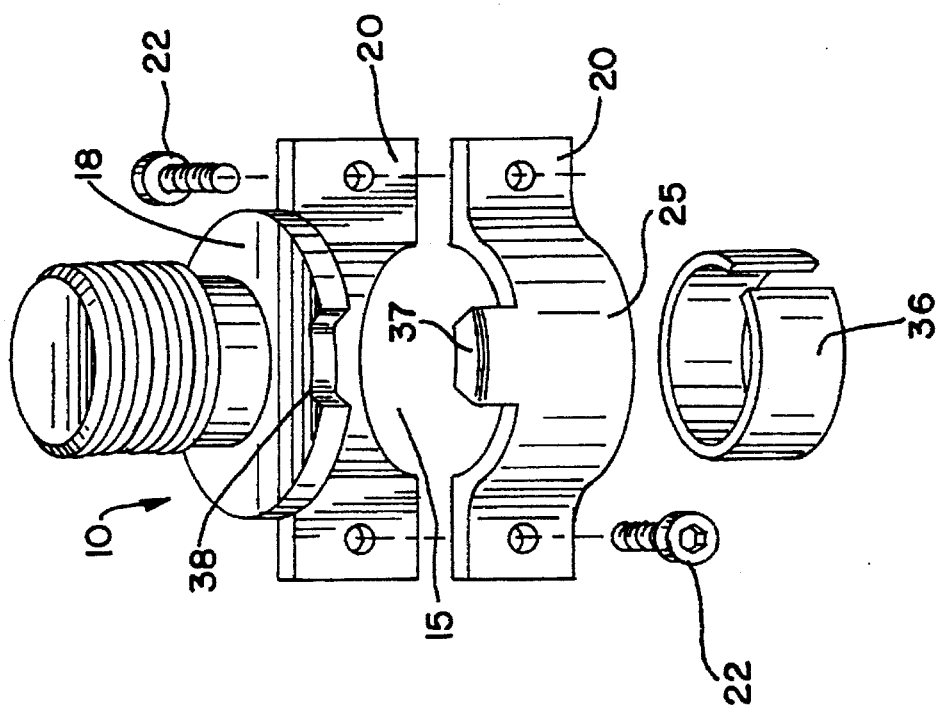

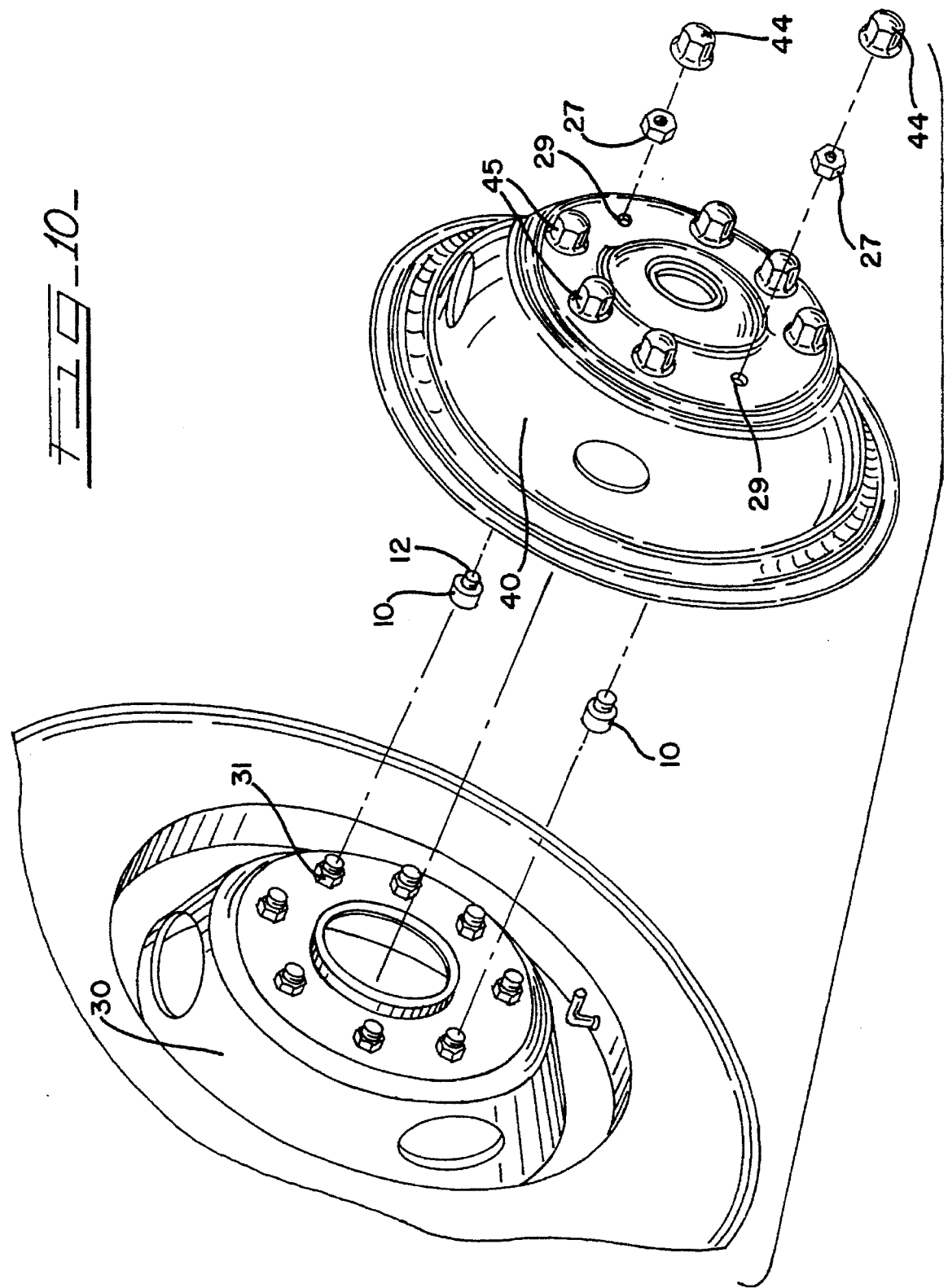

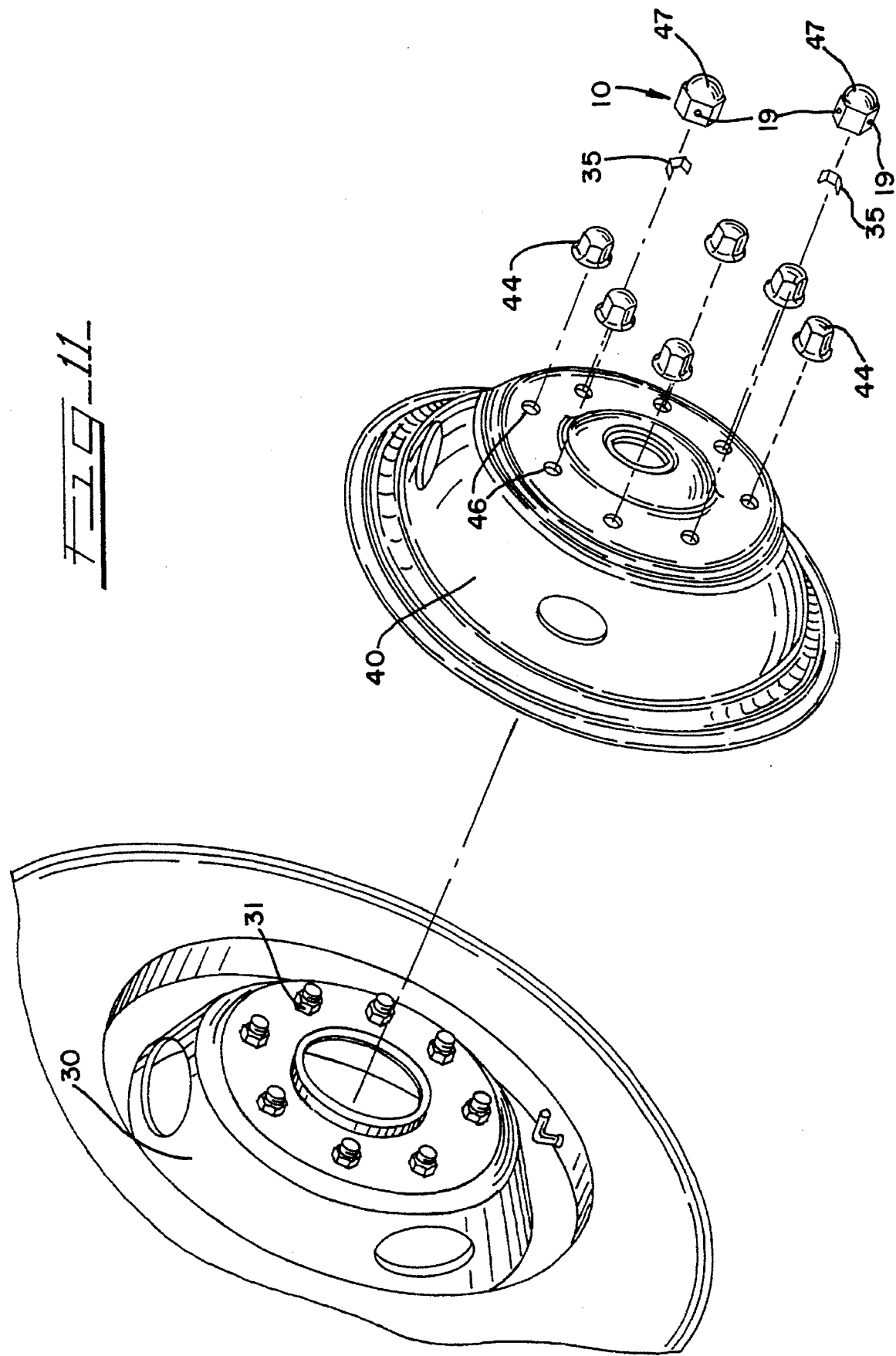

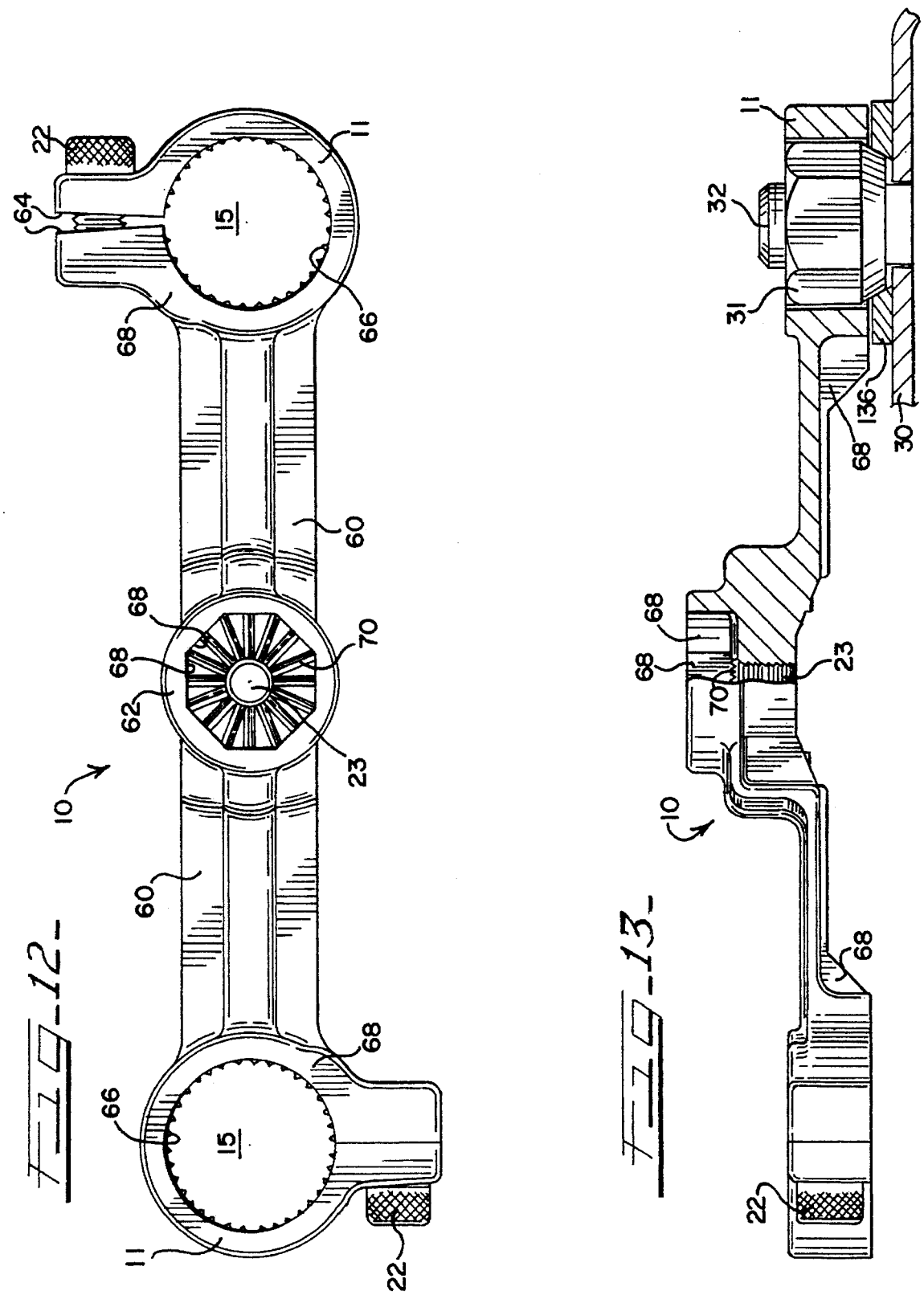

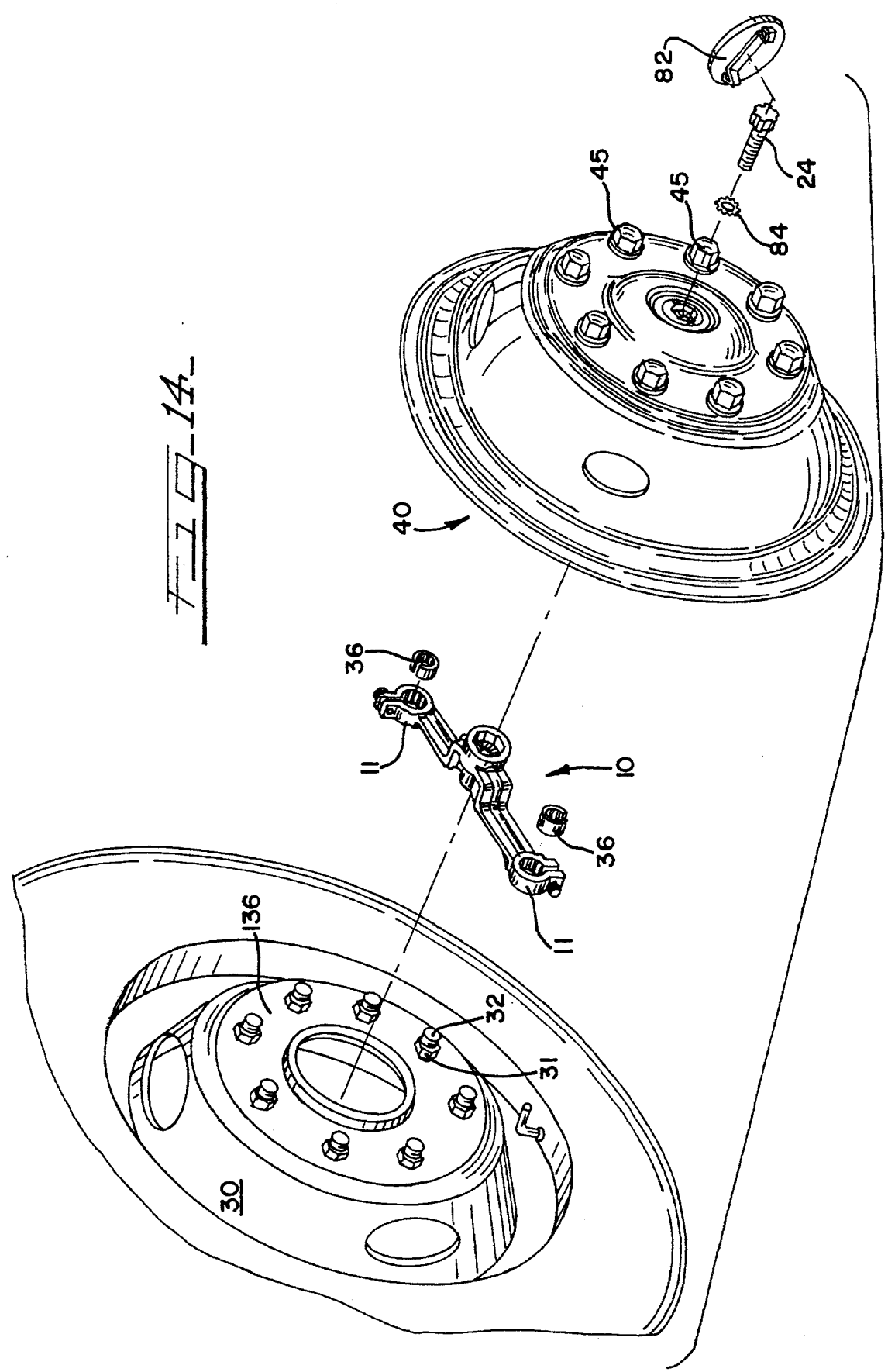

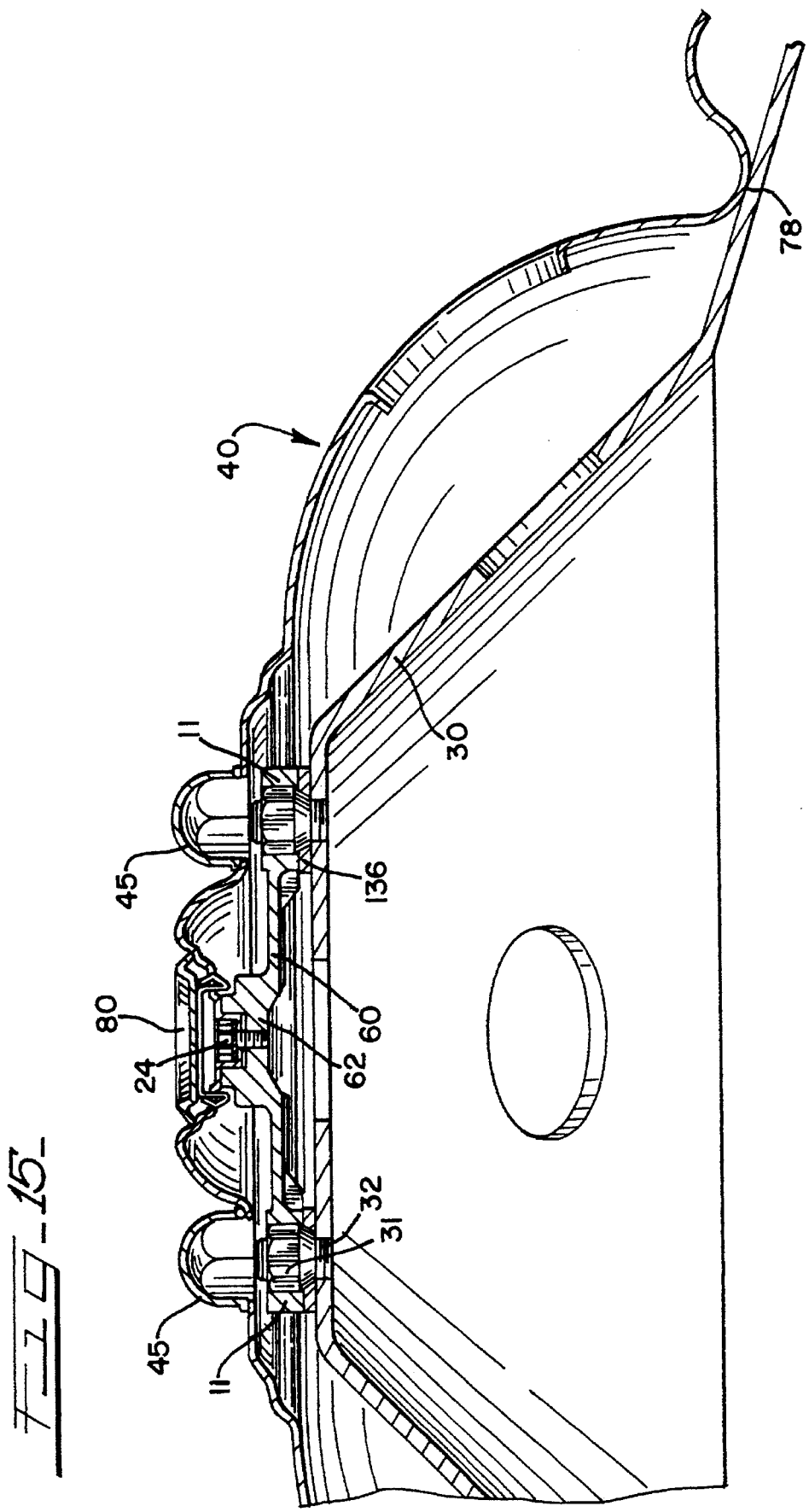

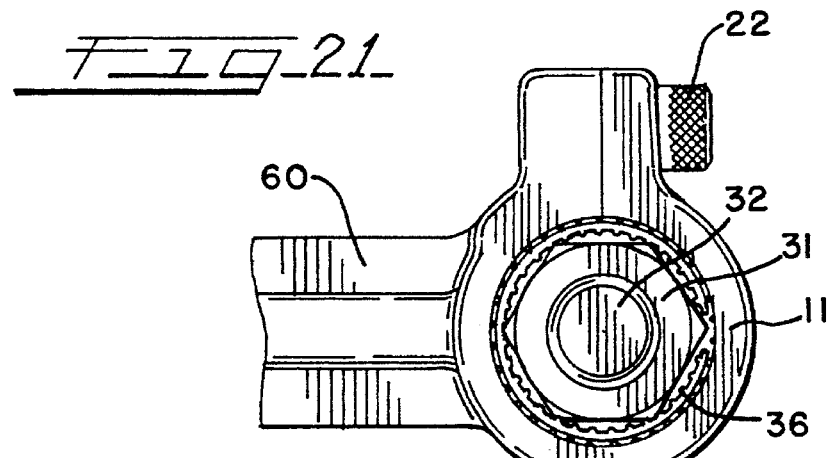
FIG_21_
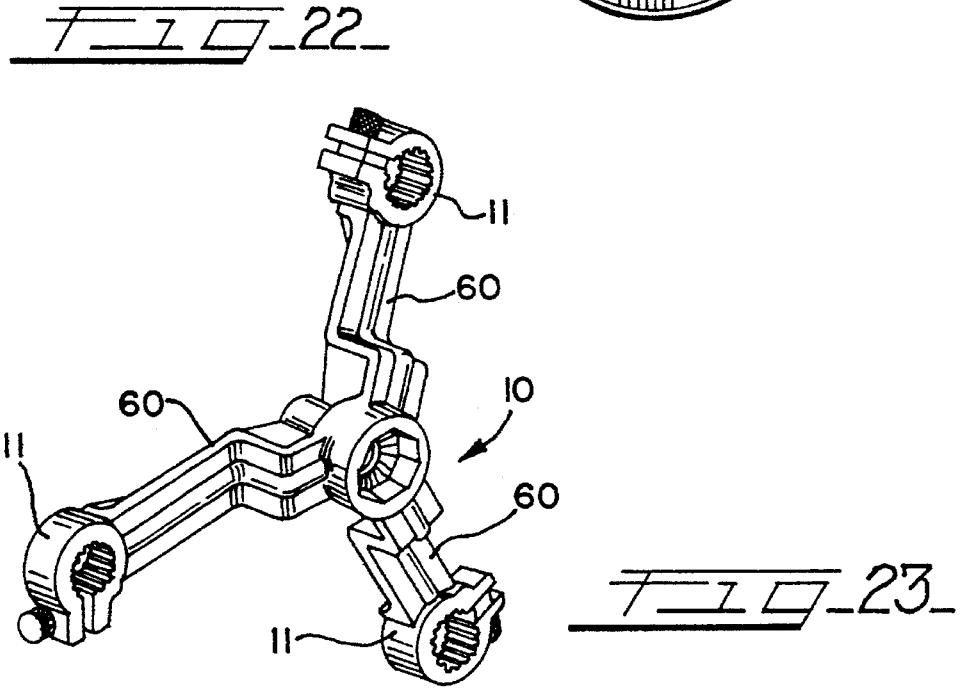
FIG_22_
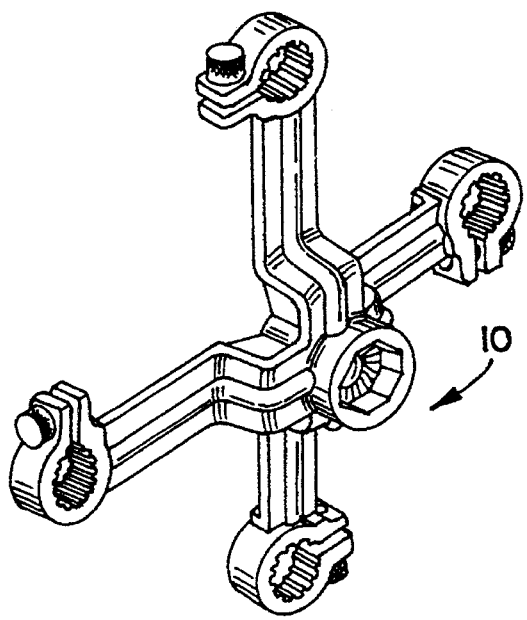
FIG_23_

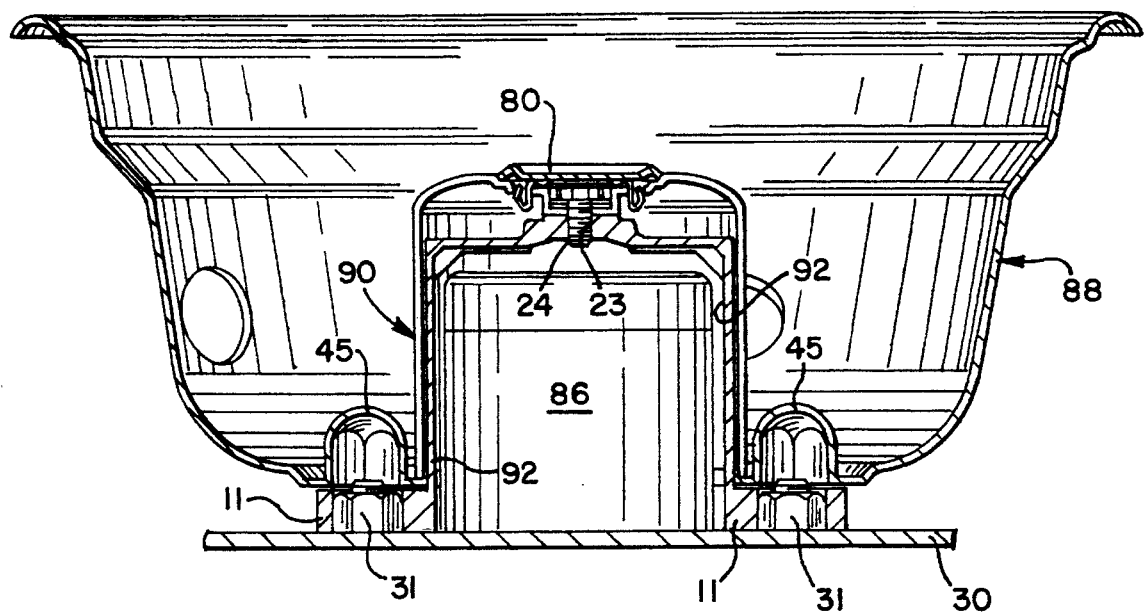
FIG_25_
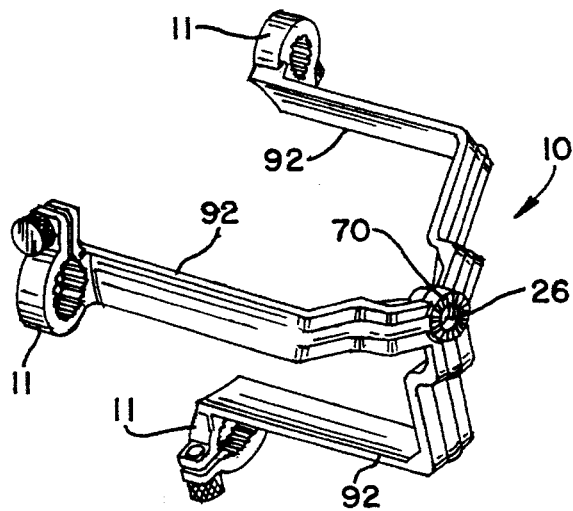
FIG_26_
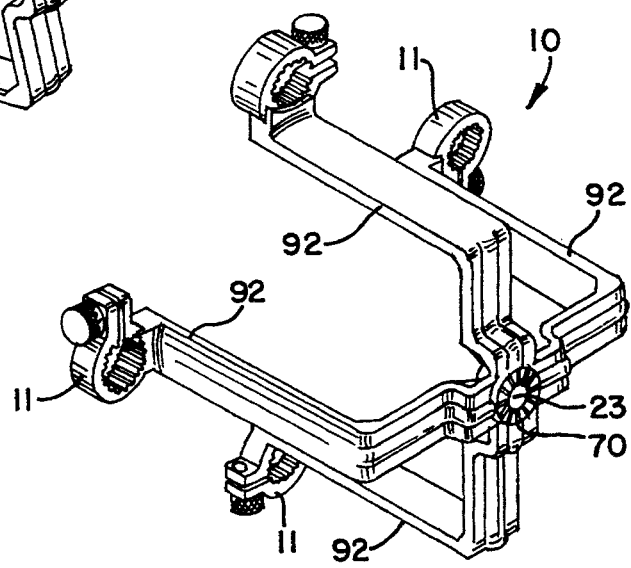
FIG_27_

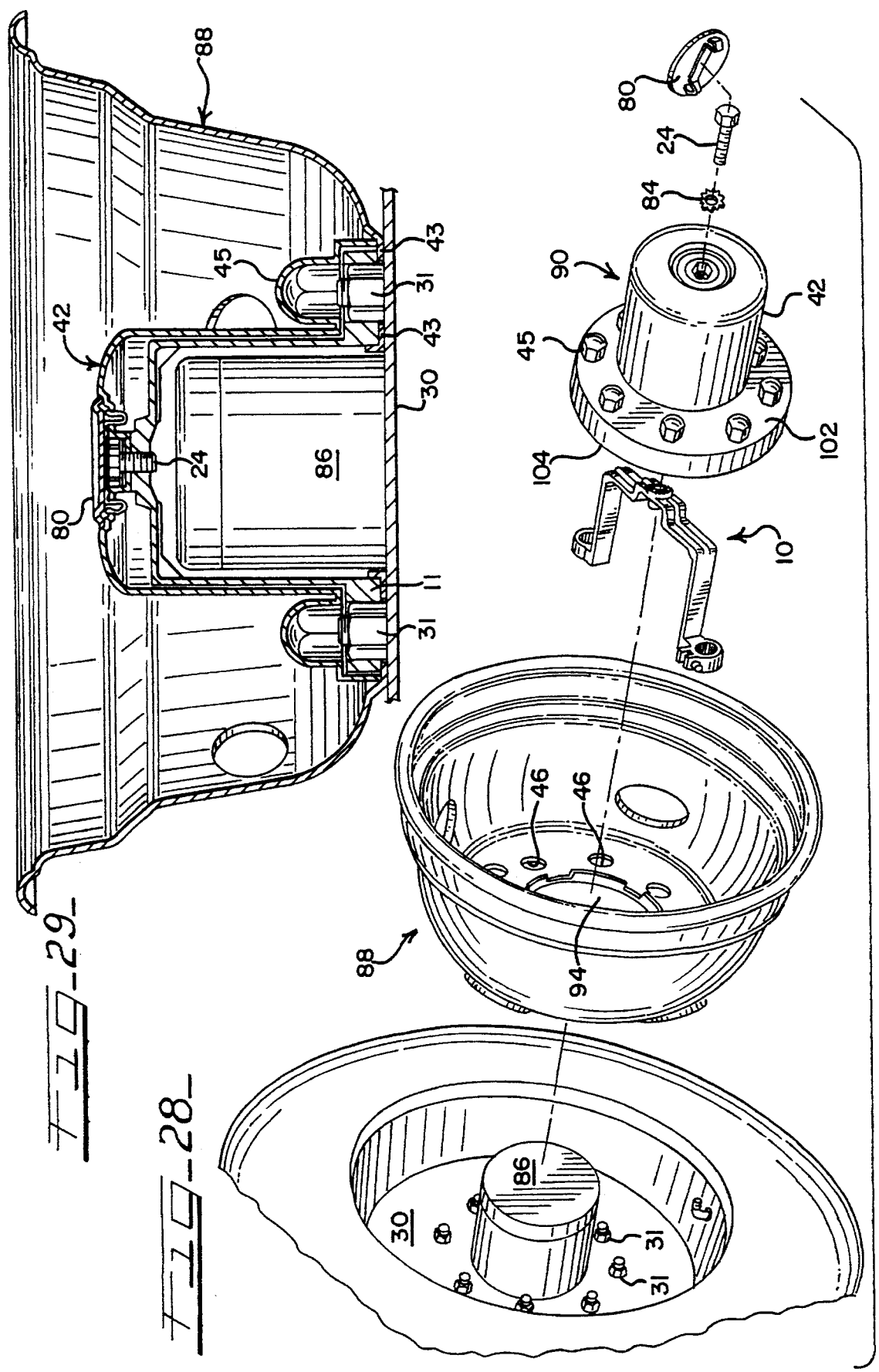

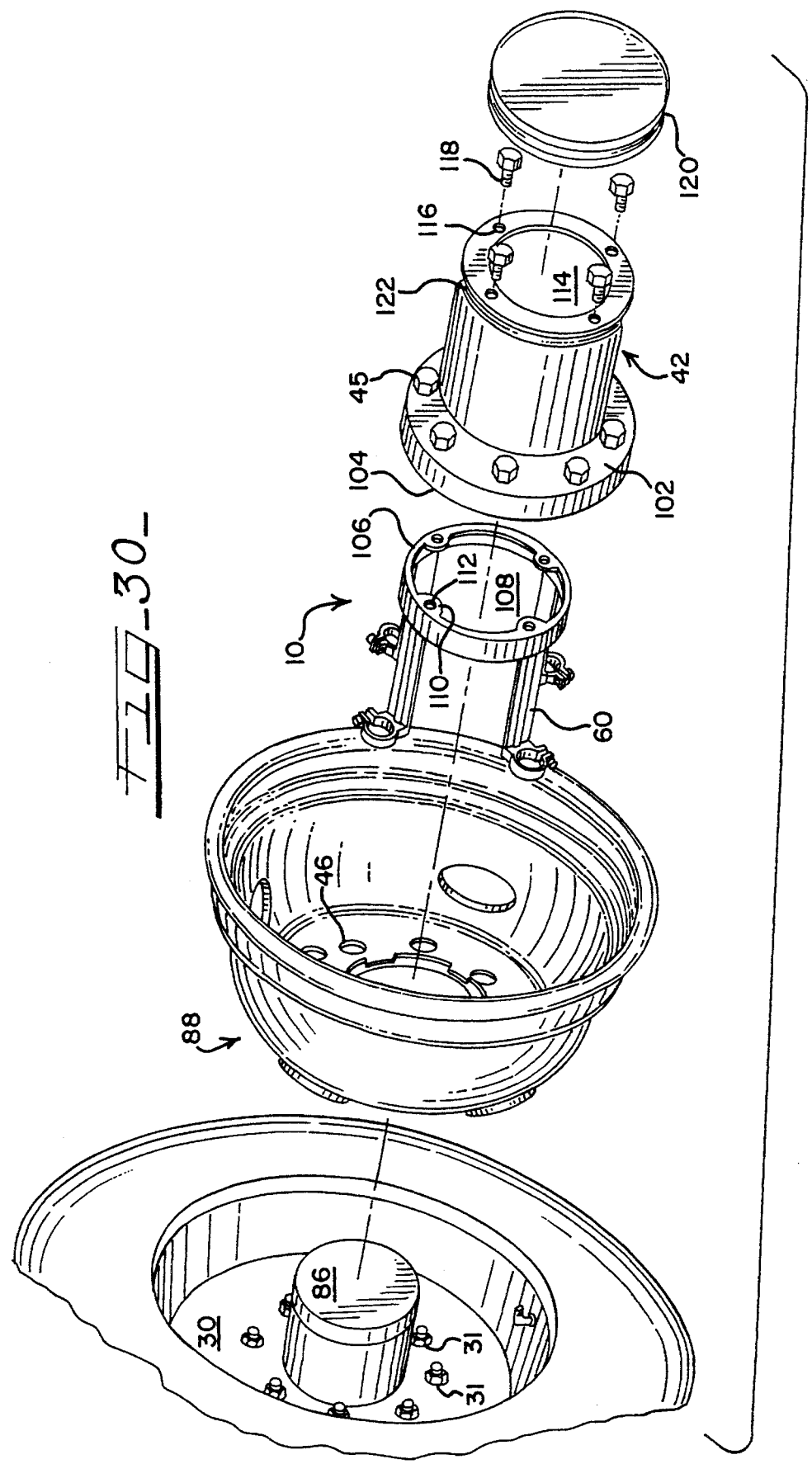

WHEEL COVER ATTACHMENT SYSTEM

This is a request for filing a divisional application under 37 CFR 1.60, of pending prior application No. 07/417,379, filed on Oct. 5, 1989 entitled WHEEL COVER ATTACHMENT SYSTEM, now U.S. Pat. No. 5,294,189, which is a continuation-in-part of Ser. No. 406,680, filed Sept. 13, 1989, abandoned.

TECHNICAL FIELD

The invention relates in general to methods and systems for attaching wheel covers or decorative wheel liners to standard automotive or truck wheels. More particularly, the invention relates to methods and systems for attaching such wheel covers to the standard lug nuts of a vehicle by means of frictionally engaging the outer periphery of the lug nut.

BACKGROUND OF THE INVENTION

Many systems are known for attaching decorative hub caps, wheel covers or decorative wheel liners to standard automotive and truck wheels to improve the appearance of a vehicle. Such decorative wheel covers allow use of less expensive painted steel wheels and standard mounting lug nuts, while providing an aesthetically pleasing appearance.

A popular form of decorative wheel covering for use with recreational vehicles and numerous truck chassis provides a stainless steel wheel liner which follows the contours of a standard steel wheel and simulates the appearance of an expensive chrome plated or cast wheel. Numerous systems have been proposed for attaching such wheel liners, including removing one or more of the mounting lug nuts and placing the liner beneath the lug nut so that the liner is retained against the wheel, or otherwise attaching the liner to the wheel such as by means of clips cooperating with hand holes in the standard truck wheel. Mounting brackets secured beneath the lug nuts, or utilizing specialized lug nuts with mounting grooves or collars, are also known.

It is desirable to provide a means of attaching such wheel covers which will not require removal of any mounting lug nuts, so that the wheel covers may be easily attached and removed by the user without need for specialized tools or removal of the lug nuts themselves. It is also desirable to provide such a system which will not affect the integrity of the wheel attachment or the cooperation of the lug nuts with the wheel itself.

There are many sizes and styles of wheels and lug nuts in common use by various manufacturers. It has typically been necessary for a specialized wheel cover mounting system to be provided for use with each of these many combinations, requiring large inventories of specialized parts. It is highly desirable to provide an improved "universal" mounting system which can accommodate several of these many configurations to provide greater flexibility and to minimize manufacturing and marketing costs.

These and other objects of the present invention will become apparent in light of the present specification and accompanying drawings.

BRIEF SUMMARY OF THE INVENTION

To achieve these objects and to overcome the problems of the prior art, the method and system of the present invention provide for secure mounting of wheel covers by means of frictional engagement with at least a portion of the outer periphery of standard vehicle lug nuts. Standard lug nuts are hexagonal with an outer periphery which includes flat peripheral surfaces for cooperating with a lug wrench, and intersections which join the flat surfaces. The frictional engagement utilized in the present invention may be with either the flat surfaces or the intersections, or both.

A means for providing the desired frictional contact and thereby securing the wheel cover to the vehicle is provided. For example, in a preferred embodiment an adaptor is provided which has a first end configured to frictionally engage the outer periphery of the lug nut, and a second end configured to cooperate with the wheel cover. In a preferred method of use, one or more adaptors are frictionally engaged with one or more lug nuts, and the wheel coves is then removably attached to the second end of the adaptor(s). The second end may, for example, comprise a threaded member such as a threaded stud or internally threaded bore, which cooperates with a complementary threaded member, such as a nut or bolt, and with an aperture in the wheel cover.

Various methods may be utilized for providing the desired frictional engagement. For example, set screws may engage one or more flat surfaces of the lug nut, or variable diameter collars may be provided to constrict and engage the outer periphery of the lug nut.

To accommodate multiple sizes of standard lug nuts, bushings may be provided with the system to allow the first end to securely frictionally engage a range of differing lug nuts sizes.

Adaptors may be provided as separate units, or may be integral with the wheel cover. Two or more separate nut-gripping elements may be joined by additional structural members to provide adaptors as wheel mounting structures, such as brackets for attaching center-mount wheel covers.

All of the described embodiments may be utilized with standard vehicle lug nuts without requiring removal or loosening of the lug nut, and without interfering with the engagement between the lug nut and the wheel.

Various means are provided of preventing or inhibiting relative rotation of wheel cover elements and the wheel.

BRIEF DESCRIPTION OF THE DRAWINGS

FIG. 1 is a side sectional view of one embodiment of the present invention.

FIG. 2 is a partial side sectional view of a mounting adaptor which may be used in conjunction with the present invention.

FIG. 3 is a partial top sectional view of the adaptor of FIG. 2, showing cross sections at two elevations.

FIG. 4 (A) and (B) are side and top views, respectively, of a bushing which may be used in conjunction with the adaptor of the present invention.

FIG. 5 is a partially cut-away perspective view of another adaptor which may be used with the present invention.

FIG. 6 is a side perspective view of another embodiment of an adaptor which may be used with the present invention.

FIG. 7 is a side perspective view of another embodiment of an adaptor which may be used with the present invention.

FIG. 8 is a side perspective view of another embodiment of an adaptor and bushing which may be used with the present invention.

FIG. 9 is a partially cut-away perspective view of another adaptor which may be used with the present invention.

FIG. 10 illustrates one embodiment of the mounting system of the present invention in use with a vehicle wheel.

FIG. 11 illustrates another embodiment of a mounting system using the present invention.

FIG. 12 is an axial view of an adaptor in the form of a bracket having two legs.

FIG. 13 is a transverse view, partly in section, of the bracket of FIG. 12.

FIG. 14 is an exploded view of a one-piece center-mount wheel cover, illustrating the nature of its mounting on a wheel using the bracket of FIGS. 13 and 14.

FIG. 15 is a transverse cross-section illustrating the apparatus of FIG. 14 mounted on a wheel.

FIG. 21 is a fragmentary axial view of the end of a leg of a bracket, showing a shim or insert used to grip a lug nut.

FIGS. 22 and 23 are perspective views of center-mount brackets having three and four legs, respectively.

FIG. 25 is a transverse elevation, partly in cross-section, illustrating the apparatus of FIG. 24 mounted on a wheel.

FIGS. 26 and 27 are center-mount brackets adapted for use on a dual mounted wheel, the brackets having three and four legs, respectively.

FIG. 28 is an exploded view showing another embodiment of a two-piece wheel cover and illustrating the nature of its mounting on a dual mount wheel.

FIG. 29 is a transverse elevation, partly in cross-section, illustrating the apparatus of FIG. 28 mounted on a wheel.

FIG. 30 is an exploded view of another embodiment of the two-piece wheel cover adapted to allow the selective exposure of the hub of a wheel in order to access such hardware as may be mounted on the hub of the wheel.

DETAILED DESCRIPTION OF PREFERRED EMBODIMENTS

The remaining portion of this specification will describe preferred embodiments of the invention when read in conjunction with the attached drawings.

Wheels are typically secured to a vehicle by means of a plurality of mounting lug nuts. FIG. 1 shows a representative wheel 30 attached by means of lug nuts 31 cooperating with threaded studs 32, commonly called lugs. In some configurations lug nuts 31 are provided with conical or circular chamfers as illustrated. Alternative designs utilizing flat bearing surfaces, or incorporating additional elements such as load distributing plates or washers, are also known. The present invention is adaptable for use with all such configurations of lug nuts.

Figure 17:
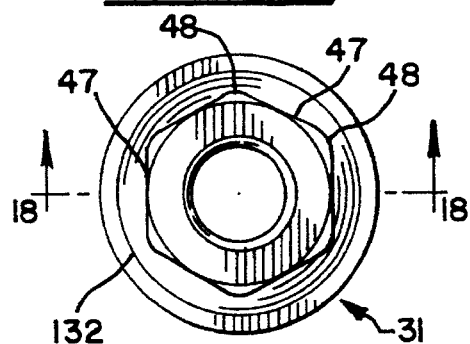
FIGS. 17 and 18, respectively, are plan and cross-sectional elevations a lug nut bearing a load-distributing element.
Figure 18:
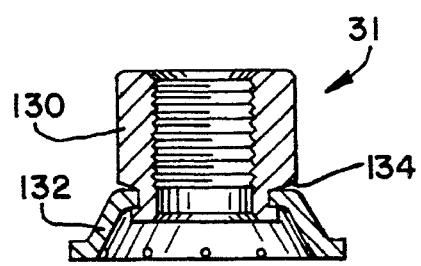

For example, FIGS. 17 and 18, respectively, show a plan view and cross-sectional elevation of a lug nut 31 commonly found on vehicles bearing the Ford brand. The nut includes a main body portion 130 and a load-distributing element 132.

Other types of lug nuts also may be used. For example, FIG. 29 includes a lug nut having a flat lower surface instead of a chamfer.

Figure 19:
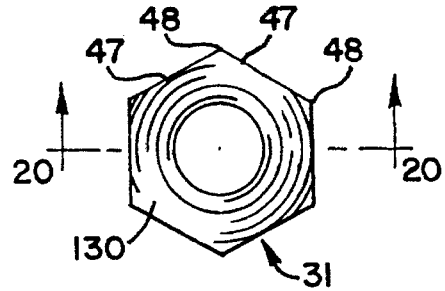
FIGS. 19 and 20, are plan and cross-sectional elevations of a common plain lug nut.
Figure 20:
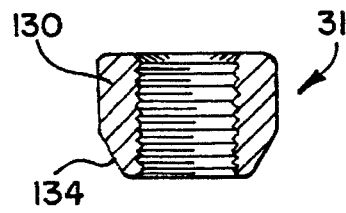

FIGS. 19 and 20 respectively show a plan view and a cross-sectional elevation of a lug nut commonly found on a variety of vehicles. It includes a main body portion 130 which bears a chamfer 134.

Frequently, especially when used on hub-mounted wheels for heavier vehicles, lug nuts of the type shown in FIGS. 19 and 20 are used in combination with a flat annular ring for purposes of improving load distribution. Such a ring is commonly called a clamping plate, an example of which is shown at 136 in FIG. 14. A clamping plate 136 may be seen in cross-section in various other drawings as well.

The particular vehicle involved will govern whether or not a clamping ring 136 is used, and the number and type of lug nut that is used. Apparatus according to the current invention is compatible with every such situation. Accordingly, the drawings of the current application should be construed as representing only examples of the types of vehicular equipment that may be used with any given embodiment according to the current invention.

In FIG. 1, a mounting adaptor 10 is shown attached to the outer periphery of lug nut 31. The adaptor 10 is illustrated in greater detail in FIGS. 2 and 3. It comprises a first end 14 which is adapted to frictionally cooperate with at least a portion of the periphery of lug nut 31 to removably secure the adaptor 10 to the lug nut. As shown in FIG. 5, the outer periphery or peripheral surfaces of the lug nut include flat peripheral surfaces or faces 47, and lines of intersection or corners 48 between surfaces 47. (Also see FIGS. 17 and 19.)

Means are provided for frictionally securing the adaptor 10 to the lug nut 31 so that it may be easily attached without disturbing the lug nut, and easily removed should it become necessary to remove the wheel. Frictional engagement may be with one or more of faces 47, one or more of intersections 48, or both. In the preferred embodiment shown, set screws 19 are provided in threaded holes 17 in collar 11, preferably located to cooperate with the first and third peripheral faces of a typical hexagonal lug nut as shown in FIG. 5. While two set screws are preferred, a greater or fewer number may be used.

The interior cavity 15 formed by collar 11 is preferably dimensioned to cooperate with the outer periphery of the associated lug nut. As illustrated in FIGS. 2, 3 and 5, it is preferred to use a hexagonally shaped cavity 15 to maximize frictional contact with the outer periphery of the lug nut. Friction-enhancing means may be provided on the inner surfaces of collar 11 to increase the frictional contact, such as ridges or raised portions. It is understood, however, that the interior cavity may take other shapes, such as circular shapes which frictionally cooperate with intersections 48 as illustrated in FIG. 8.

FIG. 4 illustrates a shim or bushing 35 which may be used in conjunction with adaptor 10. Several different sizes of lug nuts are in use today. In preferred embodiments, the interior cavity 15 is dimensioned to cooperate closely with a larger size of the differing lug nuts. A bushing 35 is then provided which may be placed inside of cavity 15 to provide a reduced dimension to accommodate one or more smaller lug nut sizes. The bushing is designed to fit snugly within at least a portion of the interior of cavity 15 to provide a reduced-size cavity cooperating closely with the smaller desired lug nut. Holes 34 may be provided in some or all of the faces of bushing 35 to allow the set screws directly to contact the lug nut.

It should be understood that although bushing 35 is illustrated as having six faces, bushings may be provided with other numbers of faces, such as three as illustrated in FIG. 11. Other shapes also may be used, such as circular bushing 36 shown in FIGS. 8 and 14 for use with adaptors having circular cavities 15. Bushings may also be provided with friction enhancing surfaces on their inner or outer surfaces, or both. It will be understood that the use of a bushing, for example such as those shown and described, to grip a smaller lug nut is equivalent to gripping a larger lug nut without using a bushing.

In this manner, a single adaptor 10 may be configured for use with several differently-sized lug nuts. For example, an adaptor whose first end 14 has an interior cavity 15 with flat-to-flat dimension of 1⅛ inches may be used to mount wheel covers on vehicles having lug nuts with either 1⅛ inch or 1 1/16 inch flat-to-flat dimension. The smaller size may be accommodated by extending set screw 19 into cavity 15 to secure the lug nut against the opposing faces of interior cavity 15.

By providing a bushing to reduce the size of cavity 15, the same adaptor 10 also may be used in conjunction with lug nuts having flat-to-flat dimension of 1 inch or of 22 millimeters. Thus, a single adaptor 10 and single bushing 35 provide a system which may be used with four different commercial lug nut sizes, while providing a highly secure frictional mount for decorative wheel covers. Of course, bushings 35 may be provided for use with the 1 1/16 inch lug nut if desired, or other bushings may be provided to accommodate additional sizes or shapes of lug nuts.

Similarly, a single adaptor 10 dimensioned to cooperate with larger lug nuts having 1½ inch flat-to-flat dimension may be used without bushings to accommodate 38 millimeter lug nuts as well, and may be used with an appropriate bushing to accommodate 32 millimeter and 33 millimeter lug nuts. Thus, a system including only two size of adaptor and two sizes of bushing may provide secure attachment of decorative wheel covers to eight or more commercially available wheel systems.

By means of an appropriate tool for use with set screws 19, such as a standard allen wrench, the user easily can attach or remove adaptor 10 from lug nut 31. Locking means may be provided in conjunction with set screw 19 or threaded hole 17 to prevent the set screw from coming loose due to vibration or strain. For example, friction-enhancing means may be interposed between the set screw and the threaded hole, such as nylon inserts or knurling on the outer periphery of the set screw.

FIGS. 6 through 9 show some alternative embodiments for first end 14 of adaptor 10. Collar 11 may be provided with means to reduce its diameter to frictionally engage the periphery of lug nut 31. For example, FIG. 6 shows a portion of collar 11 which is separated by slot 21 to allow the portion of the collar to be selectively moved inwardly against the lug nut. Ears 20 may be pulled together by bolt 22 to tighten the collar 11 around the periphery of lug nut 31. It is understood that other means may be employed for tightening the collar. FIG. 7 shows an embodiment having two such flexible portions of collar 11.

FIG. 8 shows yet another embodiment which employs a saddle clamp to engage the lug nut. Specifically, saddle member 25 is secured to a cooperating member by means of bolts 22, wherein the bolts draw the members together and frictionally engage a portion of the periphery of the lug nut between the brackets. Cavity 15 is shown having a circular configuration which, in use, will engage the intersections 48 of lug nut 31.

To maximize the axial holding power of bracket 25, finger 37 may be provided to cooperate with shoulder 18. A recess 38 also may be provided in shoulder 18 to cooperate with finger 37 and prevent rotation of the second end of the adaptor. This may be particularly useful when the first end of the adaptor comprises two removable saddle members 25.

FIG. 9 shows another means for frictionally engaging at least a portion of the periphery of the lug nut. A movable member or slider 50 is pressed against the lug nut when bolt 51, threaded through collar 49, is tightened. Slider 50 may be movably retained to adaptor 10, such as by means of fingers 52 in slots 53. Although a hexagonally shaped cavity 15 is shown, other shapes such as circular may be used. The adaptor of FIG. 9, alone or in conjunction with bushings, is easily adaptable to a wide range of lug nut sizes.

Other means for frictionally securing the adaptor to the lug nut may be employed without departing from the scope of the present invention. For example, inwardly-angled fingers may be provided on the interior of collar 11 to frictionally engage the outer periphery of the lug nut. A more complete example of using such fingers will be described with respect to FIGS. 31–33. Constricting colletts and other similar means also may be employed.

Adaptor 10 may further comprise a second end 12 including a means for mounting or attaching a decorative wheel cover such as wheel liner 40. In the preferred embodiment, this comprises a threaded member 13 and cooperating nut 27. The cover attaching means may also provide means to lock or otherwise secure the wheel cover 40 to the vehicle. For example, a locking nut may be used, such as a specially designed nut requiring a unique torque tool to apply and remove it. Other locking systems which are known may be used. In addition, friction-enhancing means may be provided to cooperate with threaded member 13 and nut 27 to prevent undesired rotation or loosening of nut 27.

Other means for providing attachment of the wheel cover may be used without departing from the scope of the present invention. By way of example, as shown in FIG. 7 the second end 12 may comprise a threaded bore 23 cooperating with a bolt 24 to secure the wheel cover 40. A portion 43 of the wheel cover in a different position or embodiment, as shown in FIG. 1 may be secured beneath adaptor 10 as shown in FIG. 1, and second end 12 eliminated or used to attach other elements of the wheel cover. In this variation, numeral 43 may represent a separate flange of cover 40, or the cover 40 in a lowered position, or an alternate shape of cover 40.

Adaptor 10 may be permanently attached to the wheel cover or some element of the wheel cover, so long as the means for effecting the frictional engagement with the periphery of the lug nut can be sufficiently accessed or released to permit removal of the cover when needed. For example, adaptor 10 may lie above cover 43, or holes may be provided through cover 40 to access set screws 19.

It will be recognized that the interference between the adaptor 10 and wheel cover 40 created by the presence of the threaded studs 32 in the apertures 29 serves the further beneficial and intended purpose of preventing rotation of the wheel cover 40 with respect to wheel 30 about the rotational axis of the wheel.

The second end 12 may be provided with an internal cavity 16 dimensioned to accommodate the portion of stud 32 extending beyond lug nut 31. In order to permit slight eccentricity in alignment between the axes of adaptor 10 and stud 32 resulting from slight mismatch in the dimensions of interior cavity 15 and lug nut 31, cavity 16 should preferably have an inner dimension which is slightly larger than the outer dimension of stud 32. Cavity 16 may alternatively have internal threads 26, as shown in FIG. 6, to engage the extending portion of stud 32. Where threads 26 are provided, it is preferable that collar 11 be circular or otherwise adapted to allow rotation of the device during application. Of course, if the first end 14 of adaptor 10 is sufficiently dimensioned to accommodate both lug nut 31 and stud 32, cavity 16 may be eliminated.

It is preferred to provide a hexagonally shaped outer surface of collar 11 as shown in FIG. 3 to reduce the amount of material used in construction of adaptor 10, and thereby keep the weight of the adaptor to a minimum. However, other shapes such as cylindrical collars (e.g. FIG. 5) may be used. Adaptors 10 may be joined to form mounting units, as will be described with respect to FIGS. 12–30.

Use of the wheel cover system of the present invention in conjunction with a typical vehicle wheel system will now be described in conjunction with FIGS. 1 and 10. Similar vehicle wheel systems are in use which utilize 4, 5, 6, 8, or other numbers of lug nuts to secure the wheel to the vehicle. Accordingly, it may be desirable to provide multiple adaptors 10 for use with certain wheels. For example, wheel 30 of FIG. 10 is illustrated with eight lug nuts, and the mounting system is shown having two adaptors 10. It should be understood, however, that greater or fewer numbers of adaptors may be employed.

In keeping with an important advantage of the present invention, it is not necessary to disturb the seating of lug nuts 31 with respect to wheel 30 in order to install the decorative wheel covering 40. Instead, the adaptors 10 are slid over the outer periphery of the lug nuts 31, and strongly or securely attached thereto by the frictional engagement described above.

The wheel covering, such as wheel liner 40, is provided with means to cooperate with adaptor 10 to mount the wheel cover 40 to the adaptors. As illustrated, this may comprise an aperture 29 dimensioned to cooperate with the threaded stud 13 of adaptor 10 of the preferred embodiment. The wheel cover or wheel liner 40 is suitably dimensioned to allow sufficient distance between the plane of apertures 29 and the wheel to accommodate lug nut 31 and the first end 14 of adaptor 10.

In the system illustrated in FIG. 10, the wheel liner 40 is a one-piece cover including a hub cover as desired. It is secured to adaptors 10 by nuts 27. Simulated decorative lug nuts 45 may be attached to the cover 40, and similar decorative caps 44 may be provided for nuts 27. The decorative cap 44 is preferably secured by light frictional contact with nut 27, in manners known in the art. This light frictional contact, sufficient only to secure the lug nut cover to the lug nut, is to be distinguished from strong or secure frictional engagement of the type provided between the lug nuts and the adaptors of the present invention.

When desired, and referring again to FIGS. 1 and 2, the wheel cover may comprise more than one element. For example, a separate hub cover 42 may be included. In one preferred embodiment, adaptors 10 are first attached to lug nuts 31. Hub cover 42 is then installed, such as by means of an aperture for cooperating with the threaded stud 13 of adaptor 10. Hub cover 42 (or, in the case of a unitary system, the wheel cover 40) sits against shoulder 18 which is formed by the transition between the first end 14 and second end 12 of adaptor 10. Wheel liner 40 is then installed, securing hub cover 42 against shoulder 18. Nuts 27 then secure wheel cover 40 to the adaptor 10, and decorative nut covers 44 may be applied. Alternatively, decorative nuts such as cap nuts 28 may be employed.

As previously noted, it also is possible to secure one or more wheel cover elements beneath adaptor 10. For example, the hub cover or wheel cover may include a flange or other portion 43, as above, to lay against wheel 30, such that the cover is installed before adaptor 10 is attached. Flange 43 is then secured against wheel 30 by the lower edge of collar 11, while threaded stud 13 may be eliminated or used to mount remaining portions of the wheel cover. In a specific system shown in FIG. 11, the adaptor 10 may take the external appearance of a decorative lug nut and secure a wheel liner 40 having apertures 46 dimensioned to pass around the vehicle lug nuts 31. Set screws 19 or other means may frictionally engage one or more such lug nut simulating adaptors 47 to one or more of the vehicle lug nuts. Less expensive decorative lug nut covers 44 may be provided for the remaining vehicle lug nuts to reduce system costs. Bushings 35 may be employed to provide the desired universal system.

Adaptor 10 may be made from any suitable material, preferably light weight but durable. For example, adaptor 10 may preferably be die cast, or may be forged of rust-resistant alloy, machined, or molded.

FIGS. 12 and 13 illustrate a mounting adaptor 10 in the form of a bracket. Two collars 11 are joined by legs 60 extending from a central joint 62. In the embodiment of FIGS. 12–14, the bracket or adaptor 10 has two legs 60 with collars 11 disposed at respective ends thereof.

Each collar 11 is provided with a substantially circular interior cavity 15 intended to receive a lug nut 31 as shown in FIG. 13. The collars 11 are split so as to be forced into frictional engagement with peripheral surfaces of a lug nut under action of bolts 22. In particular, the split collars define opposed faces 64 when the collar is loose.

Desirably, the opposed faces 64 are disposed at an acute angle with respect to each other when the collar is loose, as shown in the right hand portion of FIG. 12. By virtue of this acute angle, the opposed faces 64 will meet flush against each other when the collar is tightened, as shown in the left hand portion of FIG. 12. By disposing the surfaces 64 in this manner such that they meet flush, a gap therebetween will not exist on one or both sides of the bolt 22 when the collar 11 is properly tightened around a lug nut. Were such a gap present, one installing the bracket might tend to overtighten the collar, thereby creating excessive stress in the metal and increasing the danger of failure during use.

Desirably, additional reinforcing amounts of metal are provided in the locations enumerated 68, as these have proven to be locations that may be susceptible of failure in the absence of proper reinforcement.

The bracket may be made by casting, preferably using SAE 903, a zinc alloy.

The interior cavity 15 of each collar may be provided with friction enhancing means such as serrations 66 for improving the frictional contact between the collar 11 and a lug nut 31 or, as previously described, between the collar 11 and a shim 36. More detail of such cooperation may be seen in the fragmentary plan view of FIG. 21.

As shown in the right-hand portion of FIG. 13, the bracket 10 may be placed in firm frictional engagement with the peripheral surface of the main body portion of a lug nut 31 while that lug nut is mounted on a wheel 30, shown in fragmentary view. Typically in such a mounting, although not always, a clamping ring 136 will be present, as shown.

In use, a second lug nut will be disposed in the left-hand collar 11 in FIG. 13. In this embodiment having two legs, the two lug nuts 31 will be disposed on opposite sides of the rotational axis of the wheel. Accordingly, when the bracket 10 is mounted, the rotational axis of the wheel will be coincident with the axis of threaded bore 23 disposed centrally of the central joint 62. Therefore, the axis of threaded bore 23 defines a rotational axis of the bracket.

Central hub 62 defines a nest that also is coaxial with the rotational axis. As will be seen, the nest is intended to receive a portion of a wheel cover. For the present, it will be sufficient to note that the nest is characterized by any non-circular cross-section. In the illustrated embodiment, eight surfaces 68 define a nest having an octagonal transverse cross-section defined by the said surfaces 68 disposed about the interior periphery of the nest. Optionally, the bottom of the nest may be provided with a plurality of radially-extending angled surfaces or serrations 70 extending circumferentially of the threaded bore 23.

FIGS. 14 and 15 respectively show an exploded view and a transverse cross-section illustrating the manner in which a bracket may be used to mount a one-piece wheel cover 40 on a wheel 30. In general, it may be seen that the bracket 10 is secured to two lug nuts 31 that mount wheel 30. This action is accomplished by tightening the collars 11 into secure frictional engagement with peripheral surfaces of those lug nuts. In order to perform this operation, it is not necessary to remove or loosen any of the lug nuts 31. If necessary, circular inserts or shims 36 may be used, as has been described.

After the bracket 10 is attached, the wheel cover 40 is brought proximate wheel 30, whereupon a bolt 24 is introduced into a central opening 72 disposed on the rotational axis of the wheel cover. Central opening 72 may best be seen in FIG. 16, which is a back-side fragmentary view of the central portion of the wheel cover 40. A protrusion 74 includes eight surfaces 76. When the wheel cover 40 is introduced to the bracket 10, the protrusion 76 enters the nest of the bracket in such a way that the surfaces 76 around the periphery of the nest mate with the surfaces 68 of the bracket.

The bolt 24 is tightened in threaded bore 23 of the bracket until the configuration shown in FIG. 15 is achieved. In this configuration, the protrusion 74 is well-seated in the nest of the bracket. The serrations 70, if present, also are mated. The nest and the protrusion cooperate to provide the primary anti-rotational function, with the serrations 70, if present, enhancing the anti-rotational characteristic. It is preferred for there to be significant frictional contact between the wheel 30 and cover 40, as shown for example at 78 in FIG. 15. Such a contact will further enhance the anti-rotational characteristic of this embodiment.

If desired, the bolt 24 may be provided with anti-theft protection, such as an irregular channel formed therein and designed for cooperation with a special tool. Such a system is disclosed and described in U.S. Pat. No. 4,723,818 of Beisch et al., issued Feb. 9, 1988, and in particular with respect to FIGS. 21 and 22 thereof.

As shown in FIG. 15, the head of the bolt 24 may be recessed within an indentation formed centrally of the wheel cover 40, and covered from casual view by a snap-in cover 80 having prongs received in openings 82 (FIG. 16) of the cover 40. Anti-rotation means such as a lock washer 84 may be provided for cooperation with the bolt 24.

Figure 16:
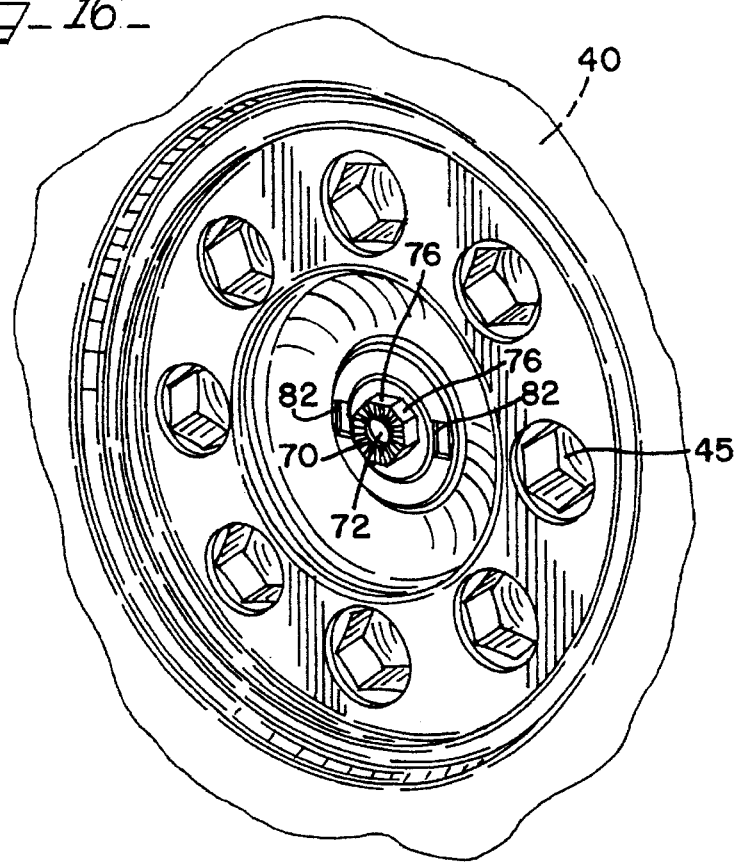
FIG. 16 is an underside view of the central portion of a one-piece wheel cover such as shown in FIG. 14.

In the embodiment of the cover 40 shown in FIGS. 14–16, a plurality of simulated decorative lug nuts 45 are integrally provided on the cover 40. As may be seen in FIG. 15, the decorative lug nuts 45 provide sufficient interior room to receive any extra length of threaded studs 32, should they happen to be longer than usual in any particular installation. However, in general, such will not be the case. Then, the number of decorative lug nuts 45 on the cover 40 need not correspond to the actual number of lug nuts 31 that mount the wheel 30. This provides for additional universality. In particular, the same cover 40 may be used with different wheels 30 having a different number of lug nuts 31.

In a preferred method of making a wheel cover 40 such as shown in FIGS. 14–16, the centermost portion thereof is formed of a separately-molded piece containing the protrusion 72 and openings 82 for receiving the prongs of the cover 80. This separate piece is then spot-welded or the like into a central aperture of the remaining portion of the cover, which may be formed in one piece by molding.

Variations of the bracket illustrated and described above are possible. For example, FIG. 22 illustrates a bracket having three legs 60 with three corresponding collars 11. Otherwise, it may be identical to the previously-described bracket. Such a bracket may be used when the number of lug nuts 31 of a particular wheel, and hence the angular disposition of the lug nuts, will not accommodate a bracket having two legs extending in diametrically opposite directions as shown in FIG. 12. It should be noted that the one-piece cover 40 shown in FIGS. 14–16 may still be used with the bracket of FIG. 22, even though the number and location of the lug nuts 31 on the wheel is varied.

FIG. 23 shows a bracket 10 having four legs. The use of four legs may be desirable when extra strength is needed, as with a truck wheel or the like. The embodiments described above are referred-to as "center-mount" wheel covers, because the connection between the cover element and the bracket occurs coaxially of the access of rotation of the wheel.

Figure 24:
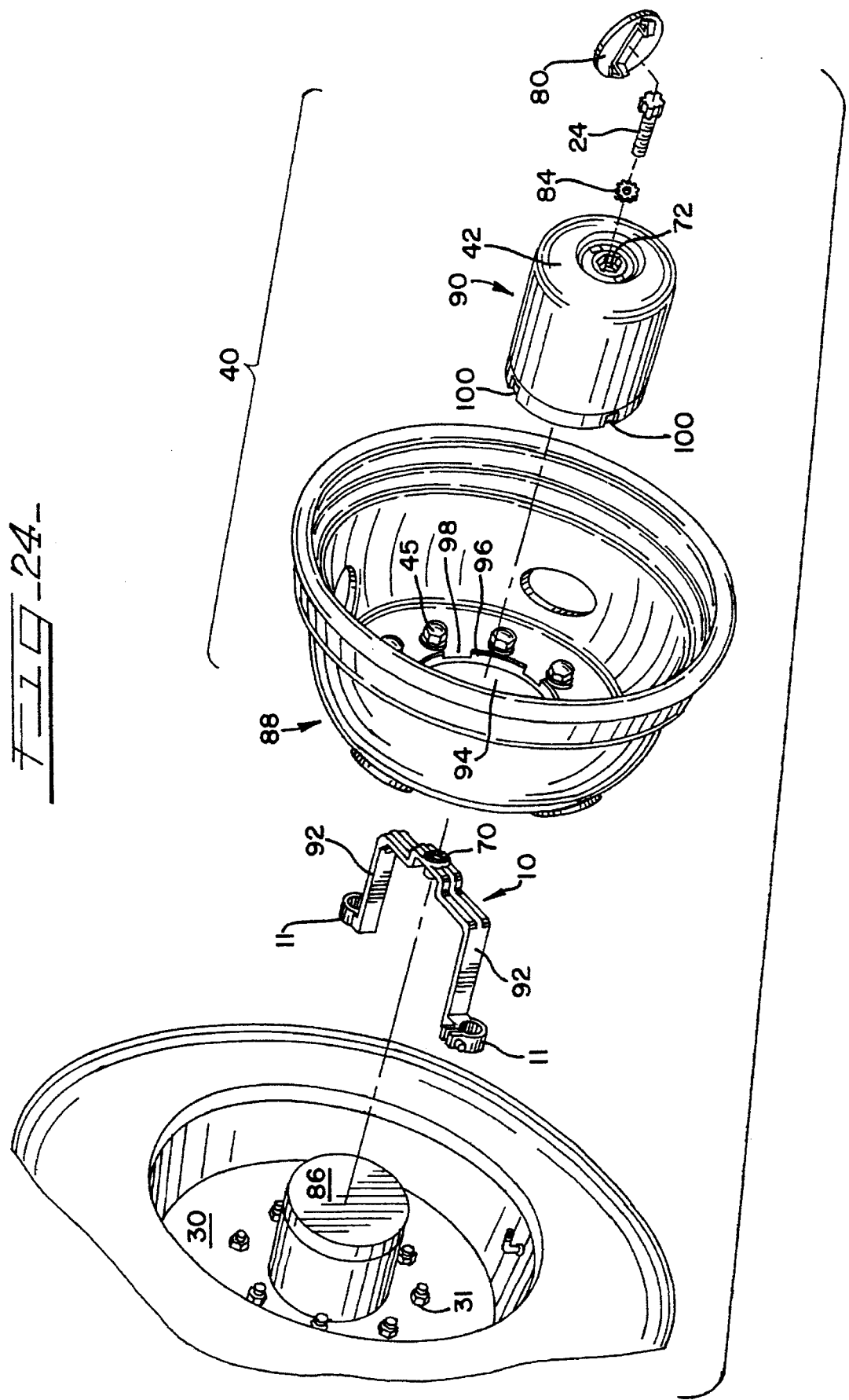
FIG. 24 is an exploded view showing an embodiment of a two-piece wheel cover and a bracket and other hardware adapted to mount it to a dual mounted wheel.

FIGS. 24 and 25 illustrate a further embodiment, useful on trucks having dual mounted rear wheels. Such wheels are characterized by a large protruding hub 86, as shown in FIGS. 24 and 25. They are characteristic of the rear wheels of larger trucks, and typically are deep, as shown, in contrast to the shallower wheels shown for example in FIG. 14. The latter may be characteristic of the front wheels of trucks and of certain lighter weight vehicles.

In order to provide a conforming cover 40 for the wheels shown in FIG. 24 and 25, a cover is provided comprising a dished piece 88 and a cupped piece 90. The bracket 10 is similar to that of FIG. 12, except that the legs are angled to provide an axially-extending portion 92. This configuration provides a central portion of the bracket for receiving the hub 86, as shown in FIG. 25.

Preferably, the radially inside and outside surfaces of the axially-extending portions 92 are curved. In this manner, they may closely and smoothly receive the lateral surfaces of a hub 86, should the diameter of that hub happen to correspond to the distance across the bracket. Curving the outside surfaces of the portions 92 may help to provide clearance for the cupped piece 90, as will be seen.

In use, the bracket 10 is tightened on lug nuts 31, as previously described. With the bracket 10 mounted on lug nuts 31, the hub 86 will be received by the bracket such that it extends alongside the axially-extending portions 92 of the legs of the bracket. Then, the dished piece 88 of wheel cover 40 is introduced to the bracket, a large central opening 94 thereof receiving both the legs of the bracket and the hub 86. In this configuration, a bottom surface of the dished piece 88 will rest on upper surfaces of the collars 11, which serve as shoulders in this embodiment. Disposed about the large central opening 94 of the dished piece 88 is an upstanding flange 96 interrupted by openings 98. As shown in FIG. 25, the cupped piece 90 is received onto the bracket 10 such that its interior surface lies along the axially-extending portions 92 of the bracket. It extends downwardly in FIG. 25, passing just radially outside of the upturned flange 96 of the dished piece 88. In this manner, it also receives the hub 86. Therefore, the cupped piece 90 also is a hub cover 42.

The cupped piece 90 extends downwardly in FIG. 25, bearing on the upper surface of the dished piece 88 at a location just radially outside of the upturned flange 96. As in the previous embodiment, a bolt 24 passes through an opening 72 in the cupped piece 90 and threadedly engages a threaded bore 23 formed on the axis of rotation of the bracket 10.

In this manner, the cupped piece 90, or hub cover 42, is affixed on the bracket 10. In turn, the cupped piece 90 bears on the dished piece 88 to retain it in place against wheel 30.

A number of dimples 100 are formed along the lower edge of the cupped piece 90 and correspond in number and position to the openings 98 in the upturned flange 96 of the dished piece 88. Interference between the dimples 100 and the upturned flange 98 serves to inhibit relative rotation of the dished piece 88 with respect to the cupped piece 90. In turn, anti-rotation serrations 70 formed on the top of the bracket 10 and on the inside of the cupped piece 90 serve to inhibit relative rotation between those two members.

As in the previous embodiment, the bolt 24 may receive a lock washer 84 or the like and may be hidden from view by a snap-in cover 80.

Also as in the previous embodiment, simulated decorative lug nuts 45 formed on the dished piece 88 need not necessarily correspond in number to the lug nuts 31 on wheel 30, unless they are needed to accommodate extra length of threaded studs 32, in which case they serve an anti-rotation function.

FIGS. 26 and 27 respectively show brackets 10 similar to that of the embodiment of FIGS. 24 and 25, but with three and four legs, respectively. Each leg has an axially-extending portion 92 cooperating with the other legs of the bracket to form a space for reception of a protruding hub 86.

FIGS. 28 and 29 show a variation on the embodiment of FIGS. 24 and 25. Dished piece 88 is similar to that of the previous embodiment, except that it has apertures 46 formed therein, dimensioned and positioned so as to receive and freely pass the lug nuts 31 of wheel 30. As shown in FIG. 29, the collars 11 of bracket 10 are tightly engaged with lug nuts 31, with a portion 43 of the dished piece 80 disposed between the collars 11 and the wheel 30 (or clamping plate 136, if one is provided on the particular wheel in question). Interference between the lug nuts 31 of wheel 30 and the apertures 46 of the dished piece 88 in which the lug nuts 31 are disposed serves to prevent relative rotation between the dished piece 88 and wheel 30.

As before, a cupped piece 90 is received on the bracket 10 and is affixed to the bracket by a bolt 24 received in a threaded bore 23. In this embodiment, cupped piece 90 further includes a flange 102 bearing simulated decorative lug nuts 45. At the periphery of flange 102 is an axially-extending rim 104 that extends toward an upper surface of dished piece 88 in FIG. 29. The simulated decorative lug nuts 45 need not necessarily correspond in number to the lug nuts 31 and lug nut receiving apertures 46. As in previously-described embodiments, serrations 70 formed on the bracket 10 and the interior of the cupped piece 90 serve to inhibit relative rotation of the cupped piece 90 with respect to wheel 30.

FIG. 30 illustrates a departure from the center-mount wheel covers of the embodiments of FIGS. 12–16 and 21–29. This variation is intended for use in vehicles in which certain types of hardware are provided on the hub, the hardware being of a type that requires periodic access. Such hardware is frequently found on dual mounted rims in heavier trucks of the type illustrated. Examples of such hub-mounted hardware are odometers that require periodic access for reading and resetting, and axle oilers such as those referred to as "Stemco" units. To allow access to such hub-mounted hardware, the apparatus of FIG. 30 is configured to allow a human hand to reach the hub of the wheel on which the apparatus is mounted without the necessity of removing major pieces of the apparatus.

In particular, bracket 10 comprises substantially parallel axially-extending legs 60 that mount, at the axially outward ends thereof, a mounting ring 106 having an open center 108. The open center 108 is of a size to allow the passage of a human hand.

A plurality of inwardly-extending tabs 110 bear threaded holes 112.

The axially outer end of hub cover 42 also is provided with an open center 114. Around the open center are formed passages 116 disposed in locations corresponding to the threaded holes 112 of the bracket 10.

The open center 114 of hub cover 42 also is of a size appropriate for the passage of a human hand. More particularly, openings 108 and 114 are desirably circular and have a diameter of at least about 4½ inches.

Hub cover 42 is mounted to bracket 10 by a plurality of bolts 118 adapted to pass through the passages 116 and be threadedly received in the threaded bores 112.

A protective cap 120 may be snapingly received on hub cover 42, as by a groove 122 or the like.

Depending on the nature of the hub-mounted hardware to be accessed and on the nature of the access desired, the sizes of the access openings in the bracket and hub cover may be made smaller or larger than one specially-sized for a human hand.

In other respects, the embodiment of FIG. 30 may be like that of FIGS. 28 and 29. When it is desired to access hardware mounted on hub 86, one need only to remove the protective cap 120 in order to achieve such access.

It may be seen that the embodiments of FIGS. 24–27 in which the dished portion 88 of the wheel cover 40 rests on faces of collars 11, are suitable for modification of the brackets 10 to provide for access to the hub such as that shown and described with respect to FIG. 30.

Figure 31:
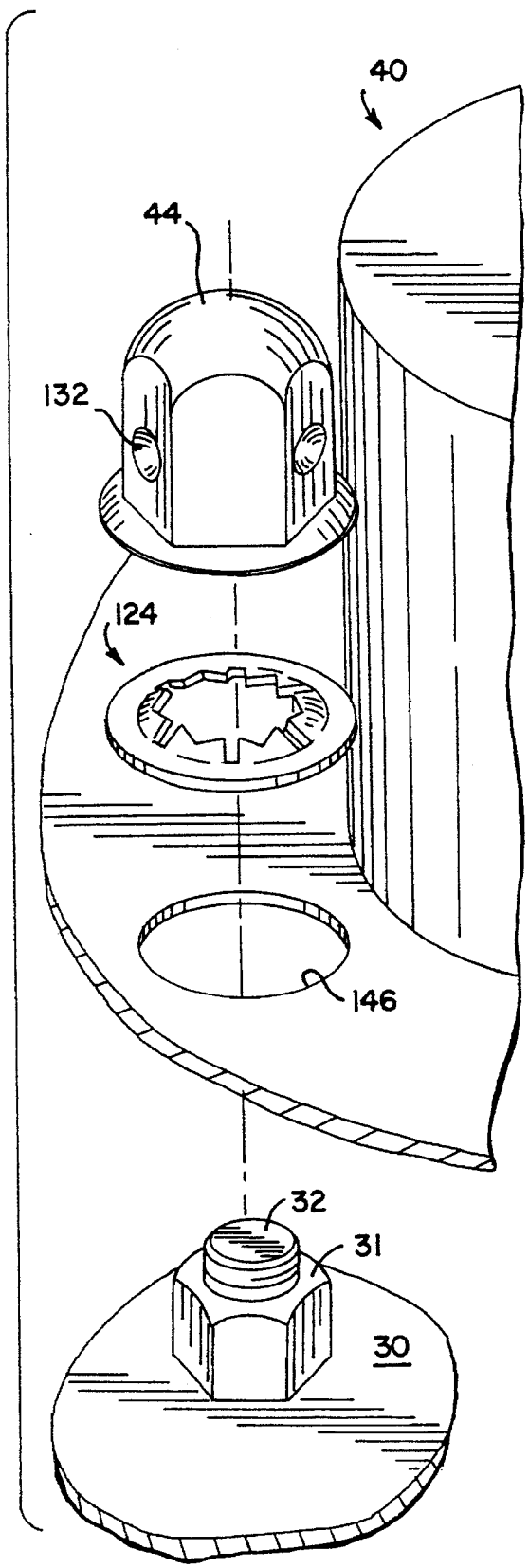
FIG. 31 is an exploded view showing a one-piece wheel cover in fragmentary perspective and illustrating the use of one of a plurality of push nuts to mount the wheel cover on a wheel.
Figure 32:
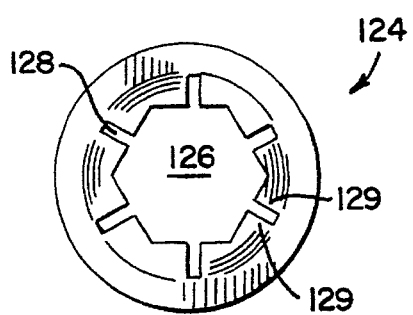
FIG. 32 is a plan view of the push nut of FIG. 31.
Figure 33:
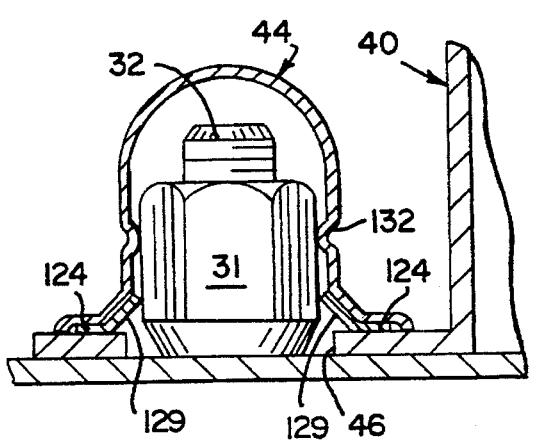
FIG. 33 is an axial elevation, partly in cross-section, illustrating a wheel cover mounted on a wheel using a push nut.
Figure 35:
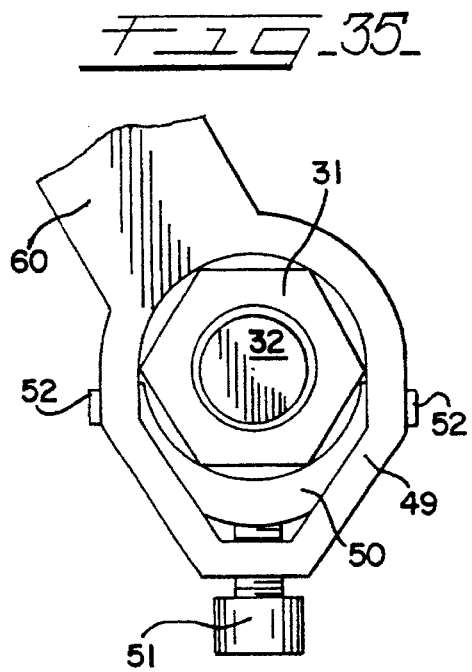
FIGS. 35–37 are plan, side and front views, respectively, of the end of a leg of a bracket provided with a slider.

Now with respect to FIGS. 31–33, there is shown a fragmentary perspective view of a one-piece wheel cover 40 having apertures 46, only one of which is shown. The apertures 46 are dimensioned and located to receive lug nuts 31 of wheel 30. A corresponding number of push nuts 124 are provided.

As may be seen in FIG. 3, after the lug nuts 31 are received in apertures 46, push nuts 124 may be pressed onto lug nuts 31.

A central aperture 126 of push nuts 124 is congruent but smaller than the corresponding cross-section of lug nuts 31. This central opening 126 cooperates with grooves 128 to define a plurality of fingers 129. As may be seen in FIG. 33, when the push nut 124 is in place, the fingers 129 extend upwardly to make firm frictional engagement with outer peripheral surfaces of lug nut 31, thereby retaining in place the wheel cover 40.

If desired, decorative cups 44 may be provided to cover the lug nuts 31, threaded studs 32 and push nuts 124. They may be held in place on the lug nut by light frictional engagement, such as that provided by dimples 132. If desired, fingers 129 might be manufactured integrally with cap 44.

Figure 34:
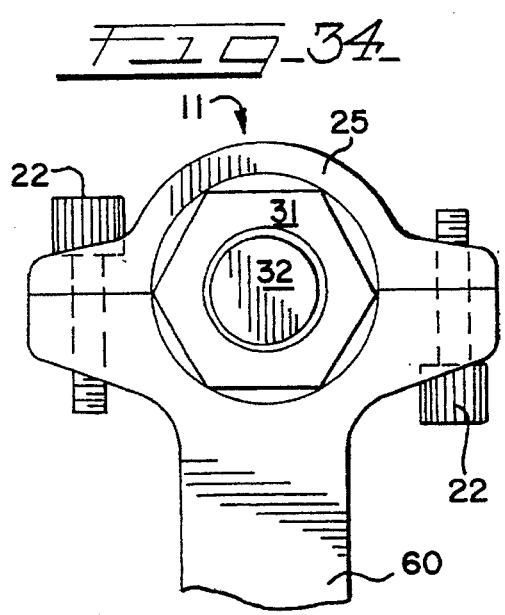
FIG. 34 is a plan view of the end of a leg of a bracket, illustrating a collar of the "saddle-T" type.

FIG. 34 is a fragmentary plan view of an end of a bracket leg showing an alternative embodiment of a collar 11. In particular, a "saddle-T" is formed as a two-piece connection. Saddle member 25 cooperates with a corresponding member formed on the end of a leg 60 and is held in place by bolts 22.

Similarly, and as shown in FIG. 35–40, a leg 60 of a bracket may be provided with a slider 50 similar to that shown and described in regard to FIG. 9. Ears 52 of slider 50 are received in slots 53 of a collar 49. Bolt 51 is used for bringing slider 50 and the remainder of its bracket into firm frictional engagement with peripheral surfaces of a main body portion of the lug nut.

Figure 36:
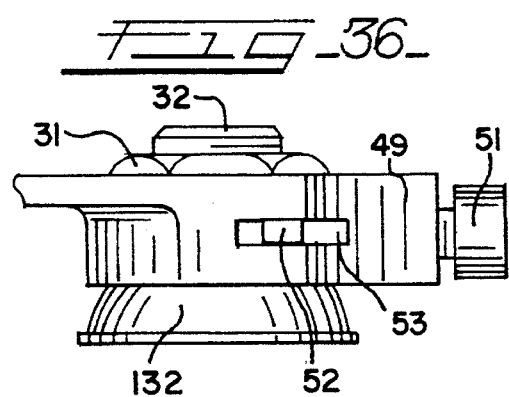
Figure 37:
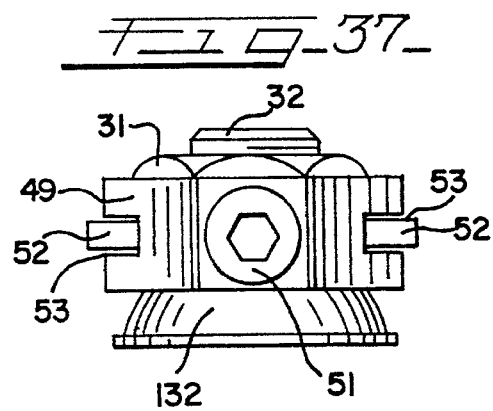
Figure 38:
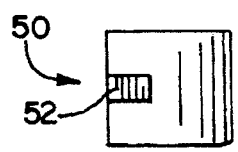
FIGS. 38–40 are side, rear and plan views, respectively, of the slider of FIGS. 35–37.

In FIGS. 36 and 37, the apparatus is shown mounted on a lug nut of the type shown and described in regard to FIGS. 17 and 18. Naturally, other types of lug nuts may be engaged.

Figure 39:
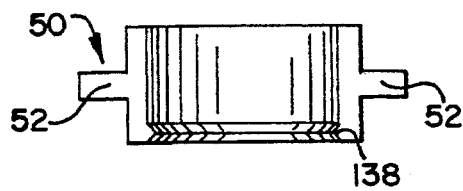
Figure 40:
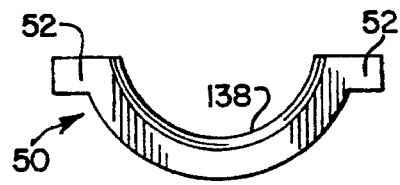

If desired, and as shown in FIGS. 39 and 40, a small circular lip 138 may be provided at the base of a slider 50. Lip 138 is positioned so as to enhance retention by engaging a chamfer at the base of a standard lug nut or disposed between a main body portion 130 and low-distributing element 132 of the lug nuts shown in FIGS. 17 and 18.

It should be understood that the present invention may be embodied in other specific forms without departing from its spirit or essential characteristics. The present embodiments are, therefore, to be considered in all respects as illustrative and not restrictive. All changes which come within the meaning and range of the equivalents of the claims are, therefore, intended to be embraced therein.

We claim:

1. A method of attaching a wheel cover to a vehicle wheel mounted by at least one lug nut, comprising the steps of:

providing a wheel cover having at least one piece with at least one aperture formed therein of a size sufficient to pass the at least one lug nut therethrough;

placing the at least one piece of the wheel cover against the wheel such that one or more of said at least one lug nut are disposed in corresponding one or more of said at least one aperture;

holding the at least one piece of the wheel cover in place against the wheel by attaching at least one removable mounting adaptor to a corresponding lug nut by securely frictionally engaging the adaptor to at least a portion of the outer peripheral surface of the corresponding lug nut.

2. The method of claim 1, wherein said step of frictionally engaging includes the step of tightening a set screw to cause frictional contact with the corresponding lug nut.

3. The method of claim 1, wherein said step of frictionally engaging comprises frictionally engaging at least one flat peripheral surface of the corresponding lug nut.

4. The method of claim 1, wherein said step of frictionally engaging comprises frictionally engaging intersections between flat peripheral surfaces of the corresponding lug nut.

5. The method of claim 1 further comprising the step of inserting a spacer bushing between one of said one or more lug nuts and the mounting adaptor attached thereto.

6. The method of claim 1, wherein said at least one removable mounting adaptor comprises a push nut.

7. The method of claim 1, comprising a plurality of removable mounting adaptors and a plurality of lug nuts, each of said plurality of removable mounting adaptors frictionally engaging a corresponding one of said plurality of lug nuts.

8. A decorative wheel cover system comprising in combination:

a wheel cover element;

means for mounting the wheel cover element for rotation with a wheel of a vehicle;

said means for mounting comprising (1) means for securely frictionally engaging at least a portion of the outer periphery of a standard vehicle wheel lug nut and (2) means for engaging at least a portion of a standard vehicle wheel stud that cooperates with and extends beyond said lug nut;

said frictionally engaging means including means to selectively cause sufficient friction between said portion of the outer periphery of the lug nut and said frictional engaging means to cause said frictional engaging means to be removably secured to said lug nut.

9. The system of claim 8, said engaging means comprising a bore located within said means for mounting, wherein a portion of said stud is positioned within said bore.

10. The system of claim 9, said stud having exposed threads and said cavity having complementary threads that engage at least a portion of the exposed threads of said stud.

11. The system of claim 8, wherein said means for engaging comprises one or more threads to engage at least a portion of said standard vehicle wheel stud.

12. A decorative wheel cover system comprising in combination:

a wheel cover element;

means for mounting the wheel cover element for rotation with a wheel of a vehicle;

said means for mounting comprising (1) means for frictionally engaging at least a portion of the outer periphery of a standard vehicle wheel lug nut and (2) means for engaging at least a portion of a standard vehicle wheel stud, said stud cooperating with and extending beyond said lug nut.

13. The system of claim 12, said engaging means comprising a bore located within said means for mounting, wherein a portion of said stud is positioned within said bore.

14. The system of claim 13, said stud having exposed threads and said cavity having complementary threads to engage at least a portion of the exposed threads of said stud.

15. The system of claim 14, wherein said frictionally engaging means engages at least a portion of the outer periphery of said lug nut and prevents the complimentary threads of said cavity from counter-rotating away from said wheel.

16. The system of claim 12, said means for mounting further comprises external threads; and said system further comprising an internally threaded member for cooperating with said external threads to secure said wheel cover element to said vehicle.

17. The system of claim 16, further comprising a cap substantially enclosing said cooperating threaded member.

18. The system of claim 16, said cooperating threaded member comprising a decorative nut engaging said external threads.

19. The system of claim 12, wherein said frictionally engaging means has an interior having a recess dimensioned to receive at least a portion of the exterior of said lug nut, so that the lug nut fits at least partially inside said interior.

20. The system of claim 19, wherein said frictionally engaging means further comprises a set screw.

21. A decorative wheel cover system comprising in combination.:

a wheel cover element;

means for mounting the wheel cover element for rotation with a wheel of a vehicle;

said means for mounting comprising means for securely frictionally engaging at least a portion of the outer periphery of a standard vehicle wheel lug nut, said frictionally engaging means comprising:

a support that substantially encircles said lug nut; and an engagement member attached to said support and projecting toward and frictionally engaging either at least one flat peripheral surface or at least one intersection between flat peripheral surfaces of said lug nut to cause sufficient friction therebetween so as to cause said frictional engaging means to be secured to said lug nut.

22. The system of claim 21, wherein said engagement member comprises a set screw.

23. The system of claim 21, wherein said engagement member comprises one or more fingers.

24. The system of claim 21, wherein said support comprises the body of a push nut, and wherein said engagement member comprises one or more fingers attached to said body.

25. The system of claim 24, comprising a cup to cover said lug nut.

26. The system of claim 25, wherein said body of said push nut is integrally attached to said cup.

27. The system of claim 24, further comprising a cup to cover said lug nut, and wherein said one or more fingers are integrally attached to said cup.

28. The system of claim 21, wherein said support encircles said lug nut.

* * * * *